(12) United States Patent
Lee

(10) Patent No.: US 11,700,366 B2
(45) Date of Patent: Jul. 11, 2023

(54) METHOD AND DEVICE FOR PROCESSING VIDEO SIGNAL

(71) Applicant: KT CORPORATION, Gyeonggi-do (KR)

(72) Inventor: Bae Keun Lee, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 17/507,760

(22) Filed: Oct. 21, 2021

(65) Prior Publication Data

US 2022/0046235 A1 Feb. 10, 2022

Related U.S. Application Data

(62) Division of application No. 16/619,327, filed as application No. PCT/KR2018/010414 on Sep. 6, 2018, now Pat. No. 11,184,606.

(30) Foreign Application Priority Data

Sep. 8, 2017 (KR) ........................ 10-2017-0115268

(51) Int. Cl.
| | |
|---|---|
| *H04N 19/105* | (2014.01) |
| *H04N 19/119* | (2014.01) |
| *H04N 19/159* | (2014.01) |
| *H04N 19/176* | (2014.01) |
| *H04N 19/597* | (2014.01) |

(52) U.S. Cl.
CPC ......... *H04N 19/105* (2014.11); *H04N 19/119* (2014.11); *H04N 19/159* (2014.11); *H04N 19/176* (2014.11); *H04N 19/597* (2014.11)

(58) Field of Classification Search
None
See application file for complete search history.

(56) References Cited

U.S. PATENT DOCUMENTS

| | | | |
|---|---|---|---|
| 2010/0054331 | A1 | 3/2010 | Haddad et al. |
| 2011/0182357 | A1 | 7/2011 | Kim et al. |
| 2015/0110174 | A1 | 4/2015 | Gu et al. |
| 2016/0323585 | A1 | 11/2016 | Zhai et al. |
| 2017/0034536 | A1 | 2/2017 | Filippov et al. |
| 2017/0150156 | A1 | 5/2017 | Zhang et al. |
| 2017/0150176 | A1 | 5/2017 | Zhang et al. |
| 2017/0150183 | A1 | 5/2017 | Zhang et al. |
| 2017/0150186 | A1 | 5/2017 | Zhang et al. |

(Continued)

FOREIGN PATENT DOCUMENTS

| | | |
|---|---|---|
| CN | 101529916 A | 9/2009 |
| CN | 104023241 A | 9/2014 |

(Continued)

OTHER PUBLICATIONS

Jianle Chen et al., "Algorithm Description of Joint Exploration Test Model 7 (JEM 7)", Document: JVET-G1001-v1, Joint Video Exploration Team (JVET) of ITU-T SG 16 WP 3 and ISO/IEC JTC 1/SC 29/WG 11, 7th Meeting: Torino, IT, Jul. 13-21, 2017.

(Continued)

*Primary Examiner* — Samuel D Fereja
(74) *Attorney, Agent, or Firm* — IP Legal Services, LLC

(57) ABSTRACT

A method of video decoding according to the present invention may comprise determining an intra prediction mode of a current block, determining a DC value based on at least one of top reference samples or left reference samples of the current block when the intra prediction mode of the current block is a DC mode, and deriving a prediction sample of the current block based on the DC value.

9 Claims, 15 Drawing Sheets

(56) References Cited

U.S. PATENT DOCUMENTS

| | | | |
|---|---|---|---|
| 2018/0184082 A1 | 6/2018 | Yoo et al. | |
| 2018/0309984 A1* | 10/2018 | Son | H04N 19/11 |
| 2019/0141317 A1* | 5/2019 | Heo | H04N 19/105 |
| 2019/0200021 A1 | 6/2019 | Park et al. | |
| 2019/0208209 A1* | 7/2019 | Jang | H04N 19/117 |
| 2019/0215512 A1 | 7/2019 | Lee et al. | |
| 2019/0394471 A1 | 12/2019 | Heo | |

FOREIGN PATENT DOCUMENTS

| | | |
|---|---|---|
| CN | 106134201 A | 11/2016 |
| KR | 10-2013-0020562 A | 2/2013 |
| WO | 2014/010943 A1 | 1/2014 |
| WO | 2016/200235 A1 | 12/2016 |
| WO | 2016/204478 A1 | 12/2016 |
| WO | 2017/069419 A1 | 4/2017 |
| WO | 2017/091759 A1 | 6/2017 |

OTHER PUBLICATIONS

C. Rosewarne et al., "High Efficiency Video Coding (HEVC) Test Model 16 (HM 16) Improved Encoder Description Update 9", Document: JCTVC-AB1002, Joint Collaborative Team on Video Coding (JCT-VC) of ITU-T SG16 WP3 and ISO/IEC JTC1/SC29/WG11, 28th Meeting: Torino, IT, Jul. 15-21, 2017.

China National Intellectual Property Administration, Office Action of corresponding CN Patent Application No. 201880035866.2, dated Aug. 30, 2022.

* cited by examiner

METHOD AND DEVICE FOR PROCESSING VIDEO SIGNAL

CROSS REFERENCE TO RELATED APPLICATIONS

This application is a Divisional of U.S. patent application Ser. No. 16/619,327 (filed on Dec. 4, 2019), which is a National Stage Patent Application of PCT International Patent Application No. PCT/KR2018/010414 (filed on Sep. 6, 2018) under 35 U.S.C. § 371, which claims priority to Korean Patent Application No. 10-2017-0115268 (filed on Sep. 8, 2017), the teachings of which are incorporated herein in their entireties by reference.

TECHNICAL FIELD

The present invention relates to a method and an apparatus for processing video signal.

BACKGROUND ART

Recently, demands for high-resolution and high-quality images such as high definition (HD) images and ultra-high definition (UHD) images have increased in various application fields. However, higher resolution and quality image data has increasing amounts of data in comparison with conventional image data. Therefore, when transmitting image data by using a medium such as conventional wired and wireless broadband networks, or when storing image data by using a conventional storage medium, costs of transmitting and storing increase. In order to solve these problems occurring with an increase in resolution and quality of image data, high-efficiency image encoding/decoding techniques may be utilized.

Image compression technology includes various techniques, including: an inter-prediction technique of predicting a pixel value included in a current picture from a previous or subsequent picture of the current picture; an intra-prediction technique of predicting a pixel value included in a current picture by using pixel information in the current picture; an entropy encoding technique of assigning a short code to a value with a high appearance frequency and assigning a long code to a value with a low appearance frequency; etc. Image data may be effectively compressed by using such image compression technology, and may be transmitted or stored.

In the meantime, with demands for high-resolution images, demands for stereographic image content, which is a new image service, have also increased. A video compression technique for effectively providing stereographic image content with high resolution and ultra-high resolution is being discussed.

DISCLOSURE

Technical Problem

An object of the present invention is to provide a method and an apparatus for performing intra prediction efficiently for an encoding/decoding target block in encoding/decoding a video signal.

An object of the present invention is to provide a method and an apparatus for performing an intra prediction by using a plurality of reference samples which is not neighboring each other in encoding/decoding a video signal.

An object of the present invention is to provide a method and an apparatus for performing an intra prediction by using right and bottom reference samples in encoding/decoding a video signal.

An object of the present invention is to provide a method and an apparatus for adaptively determining a range of reference samples used to calculate a DC value in encoding/decoding a video signal.

An object of the present invention is to provide a method and an apparatus for calculating a DC value by applying weights differently to each reference samples in encoding/decoding a video signal.

The technical objects to be achieved by the present invention are not limited to the above-mentioned technical problems. And, other technical problems that are not mentioned will be apparently understood to those skilled in the art from the following description.

Technical Solution

A method and apparatus for decoding a video signal according to the present invention may comprise determining an intra prediction mode of a current block, determining a DC value based on at least one of top reference samples or left reference samples of the current block when the intra prediction mode of the current block is a DC mode, and deriving a prediction sample of the current block based on the DC value. Here, a range of reference samples used to determine the DC value or a weight applied to the top reference samples or the left reference samples for determining the DC value is determined based on at least one of a size or a shape of the current block, or a position of a reference sample.

A method and apparatus for encoding a video signal according to the present invention may comprise determining an intra prediction mode of a current block, determining a DC value based on at least one of top reference samples or left reference samples of the current block when the intra prediction mode of the current block is a DC mode, and deriving a prediction sample of the current block based on the DC value. Here, a range of reference samples used to determine the DC value or a weight applied to the top reference samples or the left reference samples for determining the DC value is determined based on at least one of a size or a shape of the current block, or a position of a reference sample.

In the video signal encoding/decoding method and apparatus according to the present invention, when the current block is a non-square block, the DC value is determined by using only one of the left reference samples or the top reference samples.

In the video signal encoding/decoding method and apparatus according to the present invention, when the current block is the non-square block whose a width is greater than a height, the DC values is determined to be an average value of the top reference samples.

In the video signal encoding/decoding method and apparatus according to the present invention, when the current block is the non-square block whose a height is greater than a width, the DC value is determined to be an average value of the left reference samples.

In the video signal encoding/decoding method and apparatus according to the present invention, the DC value is determined by a weighted sum operation of the top reference samples and the left reference samples.

In the video signal encoding/decoding method and apparatus according to the present invention, when the current block is a non-square block whose a width is greater than a height, a weight applied to the top reference samples is set to be greater than the left reference samples.

In the video signal encoding/decoding method and apparatus according to the present invention, when the current block is a non-square block whose a height is greater than a width, a weight applied to the left reference samples is set to be greater than the top reference samples.

In the video signal encoding/decoding method and apparatus according to the present invention, weights applied to left reference samples whose a y coordinate is greater than a bottom row of the current block and the other left reference samples are different.

In the video signal encoding/decoding method and apparatus according to the present invention, weights applied to top reference samples whose an x coordinate is greater than a rightmost column of the current block and the other top reference samples are different.

The features briefly summarized above for the present invention are only illustrative aspects of the detailed description of the invention that follows, but do not limit the scope of the invention.

Advantageous Effects

According to the present invention, an efficient intra prediction may be performed for an encoding/decoding target block.

According to the present invention, there is an advantage of increasing the efficiency of intra prediction by performing intra prediction using a plurality of reference samples that is not adjacent to each other.

According to the present invention, there is an advantage that the efficiency of intra prediction can be improved by using the right and bottom reference samples.

According to the present invention, an efficiency of intra prediction can be improved by adaptively determining a range of reference samples used to calculate a DC value.

According to the present invention, an efficiency of intra prediction can be improved by applying different weights to reference samples when a DC value is calculated.

The effects obtainable by the present invention are not limited to the above-mentioned effects, and other effects not mentioned can be clearly understood by those skilled in the art from the description below.

MODE FOR INVENTION

Figure 1:
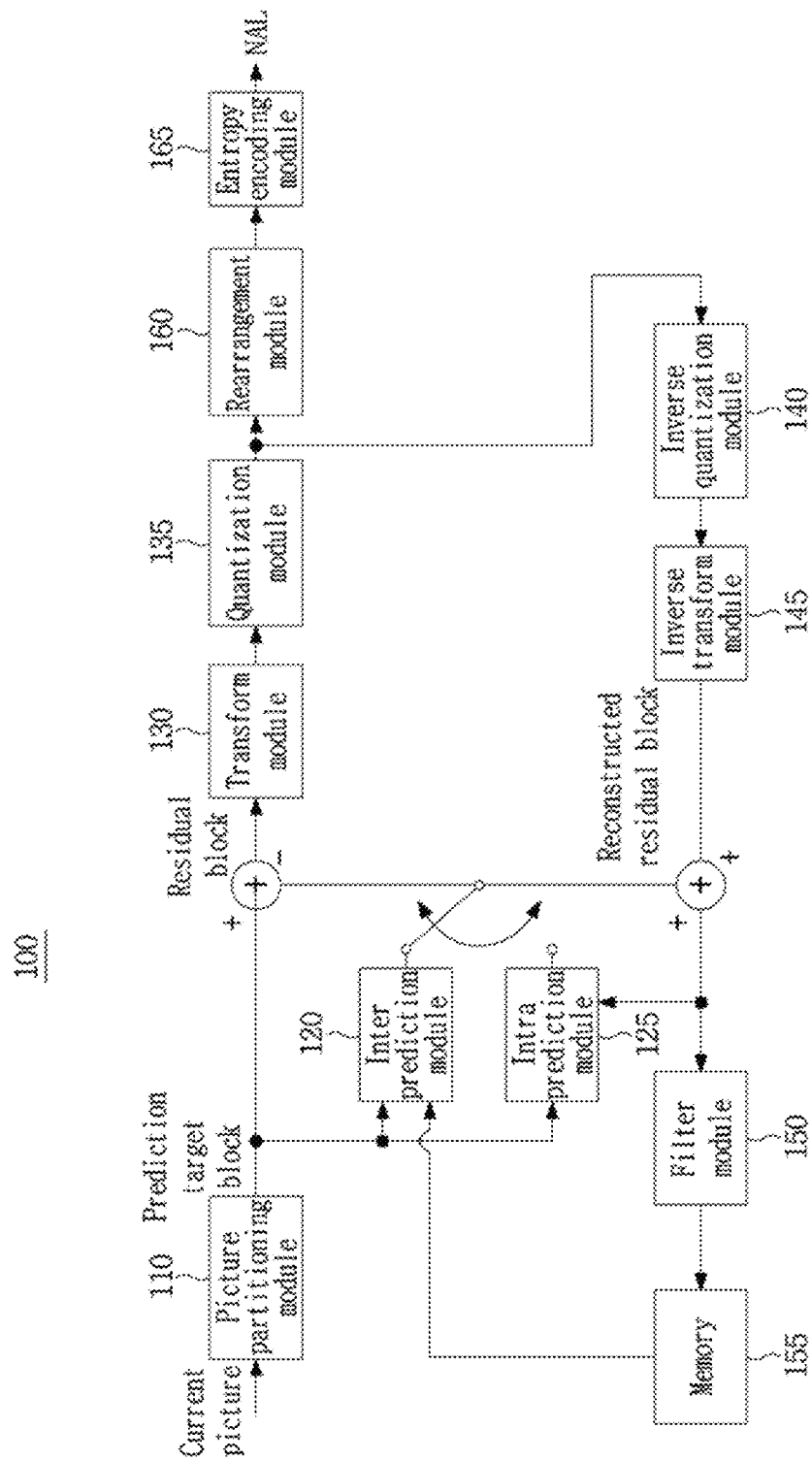
FIG. 1 is a block diagram illustrating a device for encoding a video according to an embodiment of the present invention.

A variety of modifications may be made to the present invention and there are various embodiments of the present invention, examples of which will now be provided with reference to drawings and described in detail. However, the present invention is not limited thereto, and the exemplary embodiments can be construed as including all modifications, equivalents, or substitutes in a technical concept and a technical scope of the present invention. The similar reference numerals refer to the similar element in described the drawings.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention, and the 'second' component may also be similarly named the 'first' component. The term 'and/or' includes a combination of a plurality of items or any one of a plurality of terms.

It will be understood that when an element is simply referred to as being 'connected to' or 'coupled to' another element without being 'directly connected to' or 'directly coupled to' another element in the present description, it may be 'directly connected to' or 'directly coupled to' another element or be connected to or coupled to another element, having the other element intervening therebetween. In contrast, it should be understood that when an element is referred to as being "directly coupled" or "directly connected" to another element, there are no intervening elements present.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc. are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added.

Hereinafter, preferred embodiments of the present invention will be described in detail with reference to the accompanying drawings. Hereinafter, the same constituent elements in the drawings are denoted by the same reference numerals, and a repeated description of the same elements will be omitted.

FIG. 1 is a block diagram illustrating a device for encoding a video according to an embodiment of the present invention.

Referring to FIG. 1, the device 100 for encoding a video may include: a picture partitioning module 110, prediction modules 120 and 125, a transform module 130, a quantization module 135, a rearrangement module 160, an entropy encoding module 165, an inverse quantization module 140, an inverse transform module 145, a filter module 150, and a memory 155.

The constitutional parts shown in FIG. 1 are independently shown so as to represent characteristic functions different from each other in the device for encoding a video, and does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be partitioned into a plurality of constitutional parts to perform each function. The embodiment where each constitutional part is combined and the embodiment where one constitutional part is partitioned are also included in the scope of the present invention, if not departing from the essence of the present invention.

Also, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

The picture partitioning module 110 may partition an input picture into one or more processing units. Here, the processing unit may be a prediction unit (PU), a transform unit (TU), or a coding unit (CU). The picture partitioning module 110 may partition one picture into combinations of a plurality of coding units, prediction units, and transform units, and may encode a picture by selecting one combination of coding units, prediction units, and transform units with a predetermined criterion (e.g., cost function).

For example, one picture may be partitioned into a plurality of coding units. A recursive tree structure, such as a quad tree structure, may be used to partition a picture into coding units. A coding unit which is partitioned into other coding units with one picture or a largest coding unit as a root may be partitioned with child nodes corresponding to the number of partitioned coding units. A coding unit which is no longer partitioned by a predetermined limitation serves as a leaf node. That is, when it is assumed that only square partitioning is possible for one coding unit, one coding unit may be partitioned into four other coding units at most.

Hereinafter, in the embodiment of the present invention, the coding unit may mean a unit performing encoding, or a unit performing decoding.

A prediction unit may be one of partitions partitioned into a square or a rectangular shape having the same size in a single coding unit, or a prediction unit may be one of partitions partitioned so that one prediction unit of prediction units partitioned in a single coding unit have a different shape and/or size from other prediction unit.

When a prediction unit performing intra prediction based on a coding unit is generated and the coding unit is not the smallest coding unit, intra prediction may be performed without partitioning the coding unit into a plurality of prediction units N×N.

The prediction modules 120 and 125 may include an inter prediction module 120 performing inter prediction and an intra prediction module 125 performing intra prediction. Whether to perform inter prediction or intra prediction for the prediction unit may be determined, and detailed information (e.g., an intra prediction mode, a motion vector, a reference picture, etc.) according to each prediction method may be determined. Here, the processing unit performing prediction may be different from the processing unit for which the prediction method and detailed content is determined. For example, the prediction method, the prediction mode, etc. may be determined on the basis of the prediction unit, and prediction may be performed on the basis of the transform unit. A residual value (residual block) between the generated prediction block and an original block may be input to the transform module 130. Also, prediction mode information, motion vector information, etc. used for prediction may be encoded with the residual value in the entropy encoding module 165 and may be transmitted to a device for decoding a video. When a particular encoding mode is used, it is possible to transmit to a device for decoding video by encoding the original block as it is without generating the prediction block through the prediction modules 120 and 125.

The inter prediction module 120 may predict the prediction unit based on information of at least one of a previous picture or a subsequent picture of the current picture, or may predict the prediction unit based on information of some encoded regions in the current picture, in some cases. The inter prediction module 120 may include a reference picture interpolation module, a motion prediction module, and a motion compensation module.

The reference picture interpolation module may receive reference picture information from the memory 155 and may generate pixel information of an integer pixel or less then the integer pixel from the reference picture. In the case of luma pixels, an 8-tap DCT-based interpolation filter having different filter coefficients may be used to generate pixel information of an integer pixel or less than an integer pixel on the basis of a ¼ pixel. In the case of chroma signals, a 4-tap DCT-based interpolation filter having different filter coefficient may be used to generate pixel information of an integer pixel or less than an integer pixel on the basis of a ⅛ pixel.

The motion prediction module may perform motion prediction based on the reference picture interpolated by the reference picture interpolation module. As methods for calculating a motion vector, various methods, such as a full search-based block matching algorithm (FBMA), a three step search (TSS), a new three-step search algorithm (NTS), etc., may be used. The motion vector may have a motion vector value on the basis of a ½ pixel or a ¼ pixel based on an interpolated pixel. The motion prediction module may predict a current prediction unit by changing the motion prediction method. As motion prediction methods, various methods, such as a skip method, a merge method, an AMVP (Advanced Motion Vector Prediction) method, an intra block copy method, etc., may be used.

The intra prediction module 125 may generate a prediction unit based on reference pixel information neighboring to a current block which is pixel information in the current picture. When the neighboring block of the current prediction unit is a block subjected to inter prediction and thus a reference pixel is a pixel subjected to inter prediction, the reference pixel included in the block subjected to inter prediction may be replaced with reference pixel information of a neighboring block subjected to intra prediction. That is, when a reference pixel is not available, at least one reference pixel of available reference pixels may be used instead of unavailable reference pixel information.

Prediction modes in intra prediction may include a directional prediction mode using reference pixel information depending on a prediction direction and a non-directional prediction mode not using directional information in performing prediction. A mode for predicting luma information may be different from a mode for predicting chroma information, and in order to predict the chroma information, intra prediction mode information used to predict luma information or predicted luma signal information may be utilized.

In performing intra prediction, when a size of the prediction unit is the same as a size of the transform unit, intra prediction may be performed on the prediction unit based on pixels positioned at the left, the top left, and the top of the prediction unit. However, in performing intra prediction, when the size of the prediction unit is different from the size of the transform unit, intra prediction may be performed using a reference pixel based on the transform unit. Also, intra prediction using N×N partitioning may be used for only the smallest coding unit.

In the intra prediction method, a prediction block may be generated after applying an AIS (Adaptive Intra Smoothing) filter to a reference pixel depending on the prediction modes. A type of the AIS filter applied to the reference pixel may vary. In order to perform the intra prediction method, an intra prediction mode of the current prediction unit may be predicted from the intra prediction mode of the prediction unit neighboring to the current prediction unit. In prediction of the prediction mode of the current prediction unit by using mode information predicted from the neighboring prediction unit, when the intra prediction mode of the current prediction unit is the same as the intra prediction mode of the neighboring prediction unit, information indicating that the prediction modes of the current prediction unit and the neighboring prediction unit are equal to each other may be transmitted using predetermined flag information. When the prediction mode of the current prediction unit is different from the prediction mode of the neighboring prediction unit, entropy encoding may be performed to encode prediction mode information of the current block.

Also, a residual block including information on a residual value which is a different between the prediction unit subjected to prediction and the original block of the prediction unit may be generated based on prediction units generated by the prediction modules 120 and 125. The generated residual block may be input to the transform module 130.

The transform module 130 may transform the residual block including the information on the residual value between the original block and the prediction unit generated by the prediction modules 120 and 125 by using a transform method, such as discrete cosine transform (DCT), discrete sine transform (DST), and KLT. Whether to apply DCT, DST, or KLT in order to transform the residual block may be determined based on intra prediction mode information of the prediction unit used to generate the residual block.

The quantization module 135 may quantize values transformed to a frequency domain by the transform module 130. Quantization coefficients may vary depending on the block or importance of a picture. The values calculated by the quantization module 135 may be provided to the inverse quantization module 140 and the rearrangement module 160.

The rearrangement module 160 may rearrange coefficients of quantized residual values.

The rearrangement module 160 may change a coefficient in the form of a two-dimensional block into a coefficient in the form of a one-dimensional vector through a coefficient scanning method. For example, the rearrangement module 160 may scan from a DC coefficient to a coefficient in a high frequency domain using a zigzag scanning method so as to change the coefficients to be in the form of one-dimensional vectors. Depending on a size of the transform unit and the intra prediction mode, vertical direction scanning where coefficients in the form of two-dimensional blocks are scanned in the column direction or horizontal direction scanning where coefficients in the form of two-dimensional blocks are scanned in the row direction may be used instead of zigzag scanning. That is, which scanning method among zigzag scanning, vertical direction scanning, and horizontal direction scanning is used may be determined depending on the size of the transform unit and the intra prediction mode.

The entropy encoding module 165 may perform entropy encoding based on the values calculated by the rearrangement module 160. Entropy encoding may use various encoding methods, for example, exponential Golomb coding, context-adaptive variable length coding (CAVLC), and context-adaptive binary arithmetic coding (CABAC).

The entropy encoding module 165 may encode a variety of information, such as residual value coefficient information and block type information of the coding unit, prediction mode information, partition unit information, prediction unit information, transform unit information, motion vector information, reference frame information, block interpolation information, filtering information, etc. from the rearrangement module 160 and the prediction modules 120 and 125.

The entropy encoding module 165 may entropy encode the coefficients of the coding unit input from the rearrangement module 160.

The inverse quantization module 140 may inversely quantize the values quantized by the quantization module 135 and the inverse transform module 145 may inversely transform the values transformed by the transform module 130. The residual value generated by the inverse quantization module 140 and the inverse transform module 145 may be combined with the prediction unit predicted by a motion estimation module, a motion compensation module, and the intra prediction module of the prediction modules 120 and 125 such that a reconstructed block can be generated.

The filter module 150 may include at least one of a deblocking filter, an offset correction unit, or an adaptive loop filter (ALF).

The deblocking filter may remove block distortion that occurs due to boundaries between the blocks in the reconstructed picture. In order to determine whether to perform deblocking, the pixels included in several rows or columns in the block may be a basis of determining whether to apply the deblocking filter to the current block. When the deblocking filter is applied to the block, a strong filter or a weak filter may be applied depending on required deblocking filtering strength. Also, in applying the deblocking filter, horizontal direction filtering and vertical direction filtering may be processed in parallel.

The offset correction module may correct offset with the original picture on the basis of a pixel in the picture subjected to deblocking. In order to perform the offset correction on a particular picture, it is possible to use a method of applying offset in consideration of edge information of each pixel or a method of partitioning pixels of a picture into the predetermined number of regions, determining a region to be subjected to perform offset, and applying the offset to the determined region.

Adaptive loop filtering (ALF) may be performed based on the value obtained by comparing the filtered reconstructed picture and the original picture. The pixels included in the picture may be partitioned into predetermined groups, a filter to be applied to each of the groups may be determined, and filtering may be individually performed for each group. Information on whether to apply ALF and a luma signal may be transmitted by coding units (CU). The shape and filter coefficient of a filter for ALF may vary depending on each block. Also, the filter for ALF in the same shape (fixed shape) may be applied regardless of characteristics of the application target block.

The memory 155 may store the reconstructed block or picture calculated through the filter module 150. The stored reconstructed block or picture may be provided to the prediction modules 120 and 125 in performing inter prediction.

Figure 2:
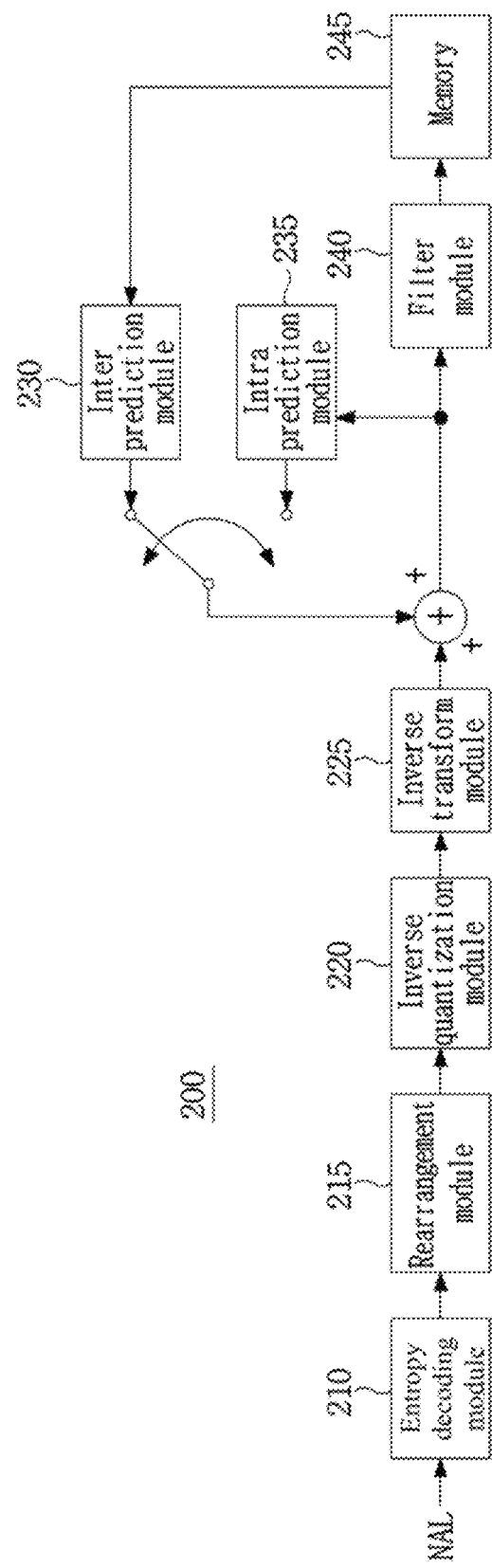
FIG. 2 is a block diagram illustrating a device for decoding a video according to an embodiment of the present invention.

FIG. 2 is a block diagram illustrating a device for decoding a video according to an embodiment of the present invention.

Referring to FIG. 2, the device 200 for decoding a video may include: an entropy decoding module 210, a rearrangement module 215, an inverse quantization module 220, an inverse transform module 225, prediction modules 230 and 235, a filter module 240, and a memory 245.

When a video bitstream is input from the device for encoding a video, the input bitstream may be decoded according to an inverse process of the device for encoding a video.

The entropy decoding module 210 may perform entropy decoding according to an inverse process of entropy encoding by the entropy encoding module of the device for encoding a video. For example, corresponding to the methods performed by the device for encoding a video, various methods, such as exponential Golomb coding, context-adaptive variable length coding (CAVLC), and context-adaptive binary arithmetic coding (CABAC) may be applied.

The entropy decoding module 210 may decode information on intra prediction and inter prediction performed by the device for encoding a video.

The rearrangement module 215 may perform rearrangement on the bitstream entropy decoded by the entropy decoding module 210 based on the rearrangement method used in the device for encoding a video. The rearrangement module may reconstruct and rearrange the coefficients in the form of one-dimensional vectors to the coefficient in the form of two-dimensional blocks. The rearrangement module 215 may receive information related to coefficient scanning performed in the device for encoding a video and may perform rearrangement via a method of inversely scanning the coefficients based on the scanning order performed in the device for encoding a video.

The inverse quantization module 220 may perform inverse quantization based on a quantization parameter received from the device for encoding a video and the rearranged coefficients of the block.

The inverse transform module 225 may perform the inverse transform, i.e., inverse DCT, inverse DST, and inverse KLT, which is the inverse process of transform, i.e., DCT, DST, and KLT, performed by the transform module on the quantization result by the device for encoding a video. Inverse transform may be performed based on a transfer unit determined by the device for encoding a video. The inverse transform module 225 of the device for decoding a video may selectively perform transform schemes (e.g., DCT, DST, and KLT) depending on a plurality of pieces of information, such as the prediction method, a size of the current block, the prediction direction, etc.

The prediction modules 230 and 235 may generate a prediction block based on information on prediction block generation received from the entropy decoding module 210 and previously decoded block or picture information received from the memory 245.

As described above, like the operation of the device for encoding a video, in performing intra prediction, when a size of the prediction unit is the same as a size of the transform unit, intra prediction may be performed on the prediction unit based on the pixels positioned at the left, the top left, and the top of the prediction unit. In performing intra prediction, when the size of the prediction unit is different from the size of the transform unit, intra prediction may be performed using a reference pixel based on the transform unit. Also, intra prediction using N×N partitioning may be used for only the smallest coding unit.

The prediction modules 230 and 235 may include a prediction unit determination module, an inter prediction module, and an intra prediction module. The prediction unit determination module may receive a variety of information, such as prediction unit information, prediction mode information of an intra prediction method, information on motion prediction of an inter prediction method, etc. from the entropy decoding module 210, may partition a current coding unit into prediction units, and may determine whether inter prediction or intra prediction is performed on the prediction unit. By using information required in inter prediction of the current prediction unit received from the device for encoding a video, the inter prediction module 230 may perform inter prediction on the current prediction unit based on information of at least one of a previous picture or a subsequent picture of the current picture including the current prediction unit. Alternatively, inter prediction may be performed based on information of some pre-reconstructed regions in the current picture including the current prediction unit.

In order to perform inter prediction, it may be determined for the coding unit which of a skip mode, a merge mode, an AMVP mode, and an inter block copy mode is used as the motion prediction method of the prediction unit included in the coding unit.

The intra prediction module 235 may generate a prediction block based on pixel information in the current picture. When the prediction unit is a prediction unit subjected to intra prediction, intra prediction may be performed based on intra prediction mode information of the prediction unit received from the device for encoding a video. The intra prediction module 235 may include an adaptive intra smoothing (AIS) filter, a reference pixel interpolation module, and a DC filter. The AIS filter performs filtering on the reference pixel of the current block, and whether to apply the filter may be determined depending on the prediction mode of the current prediction unit. AIS filtering may be performed on the reference pixel of the current block by using the prediction mode of the prediction unit and AIS filter information received from the device for encoding a video. When the prediction mode of the current block is a mode where AIS filtering is not performed, the AIS filter may not be applied.

When the prediction mode of the prediction unit is a prediction mode in which intra prediction is performed based on the pixel value obtained by interpolating the reference pixel, the reference pixel interpolation module may interpolate the reference pixel to generate the reference pixel of an integer pixel or less than an integer pixel. When the prediction mode of the current prediction unit is a prediction mode in which a prediction block is generated without interpolation the reference pixel, the reference pixel may not be interpolated. The DC filter may generate a prediction block through filtering when the prediction mode of the current block is a DC mode.

The reconstructed block or picture may be provided to the filter module 240. The filter module 240 may include the deblocking filter, the offset correction module, and the ALF.

Information on whether or not the deblocking filter is applied to the corresponding block or picture and information on which of a strong filter and a weak filter is applied when the deblocking filter is applied may be received from the device for encoding a video. The deblocking filter of the device for decoding a video may receive information on the deblocking filter from the device for encoding a video, and may perform deblocking filtering on the corresponding block.

The offset correction module may perform offset correction on the reconstructed picture based on a type of offset correction and offset value information applied to a picture in performing encoding.

The ALF may be applied to the coding unit based on information on whether to apply the ALF, ALF coefficient information, etc. received from the device for encoding a video. The ALF information may be provided as being included in a particular parameter set.

The memory 245 may store the reconstructed picture or block for use as a reference picture or block, and may provide the reconstructed picture to an output module.

As described above, in the embodiment of the present invention, for convenience of explanation, the coding unit is used as a term representing a unit for encoding, but the coding unit may serve as a unit performing decoding as well as encoding.

In addition, a current block may represent a target block to be encoded/decoded. And, the current block may represent a coding tree block (or a coding tree unit), a coding block (or a coding unit), a transform block (or a transform unit), a prediction block (or a prediction unit), or the like depending on an encoding/decoding step.

A picture may be encoded/decoded by partitioned into base blocks having a square shape or a non-square shape. At this time, the base block may be referred to as a coding tree unit. The coding tree unit may be defined as a coding unit of the largest size allowed within a sequence or a slice. Information regarding whether the coding tree unit has a square shape or has a non-square shape or information regarding a size of the coding tree unit may be signaled through a sequence parameter set, a picture parameter set, or a slice header. The coding tree unit may be partitioned into smaller size partitions. At this time, if it is assumed that a depth of a partition generated by dividing the coding tree unit is 1, a depth of a partition generated by dividing the partition having depth 1 may be defined as 2. That is, a partition generated by dividing a partition having a depth k in the coding tree unit may be defined as having a depth k+1.

A partition of arbitrary size generated by dividing a coding tree unit may be defined as a coding unit. The coding unit may be recursively partitioned or partitioned into base units for performing prediction, quantization, transform, or in-loop filtering, or the like. For example, a partition of arbitrary size generated by dividing the coding unit may be defined as a coding unit, or may be defined as a transform unit or a prediction unit, which is a base unit for performing prediction, quantization, transform, in-loop filtering, or the like.

Partitioning of a coding tree unit or a coding unit may be performed based on at least one of the vertical line or the horizontal line. In addition, the number of vertical lines or horizontal lines partitioning the coding tree unit or the coding unit may be at least one or more. For example, the coding tree unit or the coding unit may be partitioned into two partitions using one vertical line or one horizontal line, or the coding tree unit or the coding unit may be partitioned into three partitions using two vertical lines or two horizontal lines. Alternatively, the coding tree unit or the coding unit may be partitioned into four partitions having a length and the width of by using one vertical line and one horizontal line.

When a coding tree unit or a coding unit is partitioned into a plurality of partitions using at least one vertical line or at least one horizontal line, the partitions may have a uniform size or a different size. Alternatively, any one partition may have a different size from the remaining partitions.

In the embodiments described below, it is assumed that a coding tree unit or a coding unit is partitioned into a quad tree structure, a triple tree structure, or a binary tree structure. However, it is also possible to partition a coding tree unit or a coding unit using a larger number of vertical lines or a larger number of horizontal lines.

Figure 3:
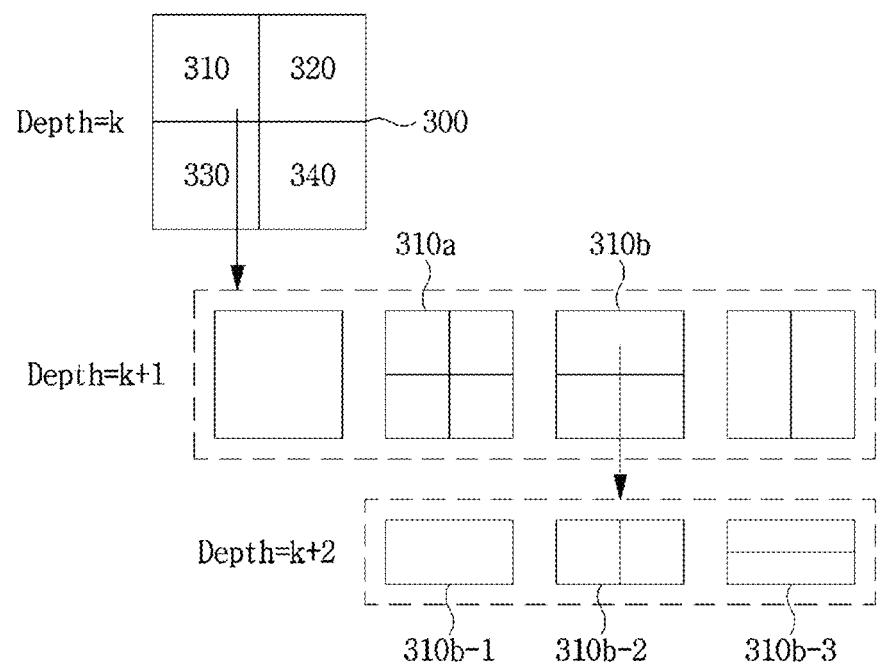
FIG. 3 is a diagram illustrating an example of hierarchically partitioning a coding block based on a tree structure according to an embodiment of the present invention.

FIG. 3 is a diagram illustrating an example of hierarchically partitioning a coding block based on a tree structure as an embodiment to which the present invention is applied.

An input video signal is decoded in predetermined block units. Such a default unit for decoding the input video signal is a coding block. The coding block may be a unit performing intra/inter prediction, transform, and quantization. In addition, a prediction mode (e.g., intra prediction mode or inter prediction mode) is determined on the basis of a coding block, and the prediction blocks included in the coding block may share the determined prediction mode. The coding block may be a square or non-square block having an arbitrary size in a range of 8×8 to 64×64, or may be a square or non-square block having a size of 128×128, 256×256, or more.

Specifically, the coding block may be hierarchically partitioned based on at least one of a quad tree, a triple tree, or a binary tree. Here, quad tree-based partitioning may mean that a 2N×2N coding block is partitioned into four N×N coding blocks, triple tree-based partitioning may mean that one coding block is partitioned into three coding blocks, and binary-based partitioning may mean that one coding block is partitioned into two coding blocks. Even if the triple-based partitioning or the binary tree-based partitioning is performed, a square-shaped coding block may exist in the lower depth. Also, after the triple-based partitioning or the binary-based partitioning is performed, generating a square-shaped coding block may be limited in a lower depth.

Binary tree-based partitioning may be symmetrically or asymmetrically performed. The coding block partitioned based on the binary tree may be a square block or a non-square block, such as a rectangular shape. For example, a partition type in which the binary tree-based partitioning is allowed may comprise at least one of a symmetric type of 2N×N (horizontal directional non-square coding unit) or N×2N (vertical direction non-square coding unit), asymmetric type of nL×2N, nR×2N, 2N×nU, or 2N×nD.

Binary tree-based partitioning may be limitedly allowed to one of a symmetric or an asymmetric type partition. In this case, constructing the coding tree unit with square blocks may correspond to quad tree CU partitioning, and constructing the coding tree unit with symmetric non-square blocks may correspond to binary tree partitioning. Constructing the coding tree unit with square blocks and symmetric non-square blocks may correspond to quad and binary tree CU partitioning.

Binary tree-based partitioning may be performed on a coding block where quad tree-based partitioning is no longer performed. At least one of quad tree-based partitioning, triple tree-based partitioning, or binary tree-based partitioning may no longer be performed on the coding block partitioned based on the binary tree.

Alternatively, the triple tree-based partitioning or the binary tree-based partitioning may be allowed for the coding block partitioned based on the binary tree, but only one of the horizontal or vertical partitioning may be limitedly allowed.

For example, an additional partition or an additional partition direction may be limited for a coding block partitioned based on the binary tree according to a location, an index, a shape, or an additional partition type of a neighboring partition of the coding block partitioned based on the binary tree, or the like. For example, when an index of the coding block that precedes the coding order among the two coding blocks generated by the binary tree based-partitioning is 0 (hereinafter referred to as coding block index 0) and an index of the coding block that follows the coding order among the two coding blocks generated by the binary tree-based partitioning is 1 (hereinafter referred to as coding block index 1), in the case where the binary tree-based partitioning is applied to all coding blocks having a coding block index of 0 or a coding block index of 1, the binary tree-based partitioning direction of the coding block having the coding block index of 1 may be determined according to a binary tree-based partitioning direction of the coding block having the coding block index of 0. Specifically, when the binary tree-based partitioning direction of the coding block having the coding block index of 0 is to partition the coding block having the coding block index of 0 into square partitions, binary tree-based partitioning of the coding block having the coding block index of 1 may be limited to have a different direction from binary tree-based partitioning of the coding block having a coding block index of 1. Thus, the coding blocks having the coding block index of 0 and the coding block index of 1 may be restricted from being partitioned into square partitions. In this case, encoding/decoding of information indicating the binary tree partitioning direction of the coding block having the coding block index of 1 may be omitted. This is because partitioning all of the coding blocks having the coding block index of 0 and the coding block index of 1 into square partitions has the same effect as partitioning the upper depth block on the basis of a quad tree, so that allowing partitioning of all into square partitions is undesirable in terms of coding efficiency.

Triple tree-based partitioning means partitioning a coding block into three partitions in the horizontal or vertical direction. All three partitions generated due to triple tree-based partitioning may have different sizes. Alternatively, two of the partitions generated due to triple tree-based partitioning may have the same size, and the other one may have a different size. For example, the width ratio or height ratio of partitions generated as the coding block is partitioned may be set to 1:n:1, 1:1:n, n:1:1 or m:n:1 depending on the partitioning direction. Here, m and n may be 1 or a real number greater than 1, for example, an integer such as 2.

Triple tree-based partitioning may be performed on a coding block in which quad tree-based partitioning is no longer performed. For the coding block partitioned based on the triple tree, at least one of quad tree-based partitioning, triple tree-based partitioning, or binary tree-based partitioning may be set to no longer be performed.

Alternatively, triple tree-based partitioning or binary tree-based partitioning may be allowed for the coding block partitioned based on the triple tree, but only one of horizontal or vertical partitioning may be limitedly allowed.

For example, an additional partition or an additional partition direction may be limited for a coding block partitioned based on the triple tree according to a location, an index, a shape, or an additional partition type of a neighboring partition of the coding block partitioned based on the triple tree, or the like. For example, one of horizontal division or vertical division may be limited to a partition having the largest size among coding blocks generated due to triple tree-based partitioning. Specifically, the largest partition among coding blocks generated due to triple tree-based partitioning may not allow binary tree partitioning in the same direction or triple tree partitioning direction in the same direction as the triple tree partitioning direction of the upper depth partition. In this case, encoding/decoding of information indicating the binary tree partitioning direction or the triple tree partitioning direction may be omitted for the largest partition among the coding blocks partitioned based on the triple tree.

Partitioning based on a binary tree or a triple tree may not be allowed according to a size or a shape of a current block. Here, the size of the current block may be expressed based on at least one of a width, a height of the current block, a minimum/maximum of the width/height, a sum of the width and the height, a product of the width and height, or the number of samples included in the current block. For example, when at least one of the width or the height of the current block is greater than a pre-defined value, partitioning based on a binary tree or a triple tree may not be allowed. Herein, the pre-defined value may be an integer such as 16, 32, 64, or 128. As another example, when a width-to-height ratio of the current block is greater than a pre-defined value or smaller than a pre-defined value, partitioning based on a binary tree or a triple tree may not be allowed. When the predefined value is 1, partitioning based on a binary tree or triple tree may be allowed only when the current block is a square block having the same width and height.

The partitioning in the lower depth may be determined depending on the partitioning type of the upper depth. For example, when binary tree-based partitioning is allowed in two or more depths, only a binary tree-based partitioning of the same type as a binary tree partitioning of an upper depth may be allowed in a lower depth. For example, when the binary tree-based partitioning is performed in the 2N×N type in the upper depth, the binary tree-based partitioning in the 2N×N type may be performed in the lower depth. Alternatively, when binary tree-based partitioning is performed in an N×2N type in an upper depth, N×2N-type binary tree-based partitioning may be allowed in a lower depth.

Conversely, it is also possible to allow only binary tree-based partitioning having a different type from the binary tree partitioning of the upper depth in the lower depth.

For a sequence, a slice, a coding tree unit, or a coding unit, it may be limited to use only a special type of binary tree-based partitioning or a special type of triple tree-based partitioning. For example, it may be limited to allow only 2N×N or N×2N type binary tree-based partitioning for a coding tree unit. The allowed partitioning type may be predefined in the encoder or the decoder, and information about the allowed partitioning type or the not allowed partitioning type may be encoded and signaled through a bitstream.

Figure 5A:
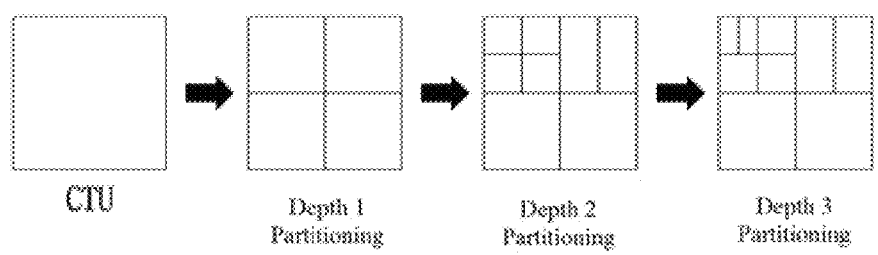
FIGS. 5A and 5B are diagrams illustrating an example in which only a binary tree-based partition of a pre-determined type is allowed according to an embodiment of the present invention.
Figure 5B:
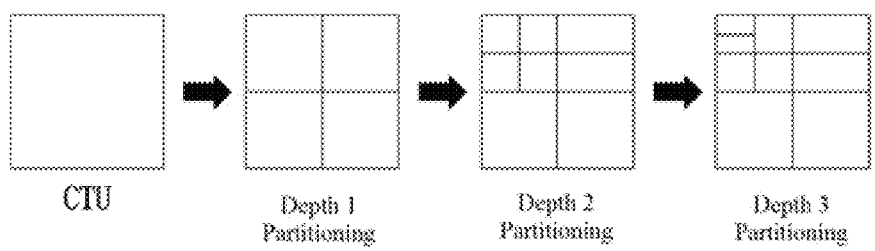

FIGS. 5A and 5B are diagrams illustrating an example in which only a specific type of binary tree-based partitioning is allowed. FIG. 5A shows an example in which only N×2N type of binary tree-based partitioning is allowed, and FIG. 5B shows an example in which only 2N×N type of binary tree-based partitioning is allowed. In order to implement adaptive partitioning based on the quad tree or binary tree, information indicating quad tree-based partitioning, information on a size/depth of the coding block that quad tree-based partitioning is allowed, information indicating binary tree-based partitioning, information on the size/depth of the coding block that binary tree-based partitioning is allowed, information on the size/depth of the coding block that binary tree-based partitioning is not allowed, information on whether binary tree-based partitioning is performed in the vertical direction or the horizontal direction, etc. may be used.

In addition, information on the number of times a binary/triple tree partitioning is allowed, a depth in which the binary/triple tree partitioning is allowed, or the number of the depths in which the binary/triple tree partitioning is allowed may be obtained for a coding tree unit or a specific coding unit. The information may be encoded on the basis of a coding tree unit or a coding unit, and may be transmitted to a decoder through a bitstream.

For example, a syntax 'max_binary_depth_idx_minus1' indicating a maximum depth in which binary tree partitioning is allowed may be encoded/decoded through a bitstream. In this case, max_binary_depth_idx_minus1+1 may indicate the maximum depth in which the binary tree partitioning is allowed.

Figure 6:
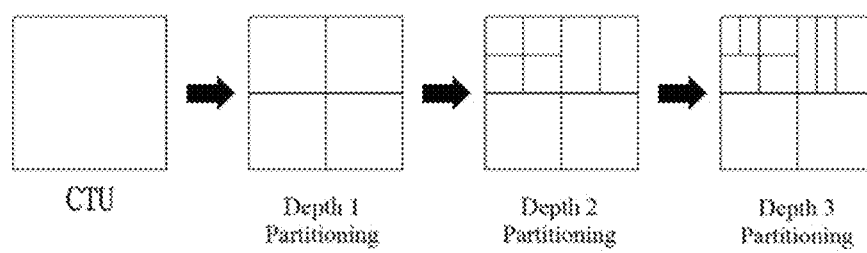
FIG. 6 is a diagram for explaining an example in which information related to the allowable number of binary tree partitioning is encoded/decoded, according to an embodiment to which the present invention is applied.

Referring to an example shown in FIG. 6, in FIG. 6, the binary tree partitioning has been performed for a coding unit having a depth of 2 and a coding unit having a depth of 3. Accordingly, at least one of information indicating the number of times the binary tree partitioning in the coding tree unit has been performed (i.e., 2 times), information indicating the maximum depth in which the binary tree partitioning has been allowed in the coding tree unit (i.e., depth 3), or the number of depths in which the binary tree partitioning has been performed in the coding tree unit (i.e., 2 (depth 2 and depth 3)) may be encoded/decoded through a bitstream.

As another example, at least one of information on the number of times the binary/triple tree partitioning is allowed, the depth in which the binary/triple tree partitioning is allowed, or the number of the depths in which the binary/triple tree partitioning is allowed may be obtained for each sequence or each slice. For example, the information may be encoded on the basis of a sequence, a picture, or a slice unit and transmitted through a bitstream. In contrast, a depth in which the binary/triple tree partitioning is allowed, or the number of the depths in which the binary/triple tree partitioning is allowed may be defined for each a sequence, a picture, or a slice unit. Accordingly, at least one of the number of the binary/triple tree partitioning in the first slice and the second slice, the maximum depth in which the binary/triple tree partitioning is allowed in the first slice and the second slice, or the number of depths in which the binary/triple tree partitioning is performed in the first slice and the second slice may be difference from a second slice. For example, in the first slice, binary tree partitioning may be allowed for only one depth, while in the second slice, binary tree partitioning may be allowed for two depths.

As another example, the number of times the binary/triple tree partitioning is allowed, the depth in which the binary/triple tree partitioning is allowed, or the number of depths in which the binary/triple tree partitioning is allowed may be set differently according to a time level identifier (TemporalID) of a slice or a picture. Here, the temporal level identifier (TemporalID) is used to identify each of a plurality of layers of video having a scalability of at least one of view, spatial, temporal or quality.

As shown in FIG. 3, the first coding block 300 with the partition depth (split depth) of k may be partitioned into a plurality of second coding blocks based on the quad tree. For example, the second coding blocks 310 to 340 may be square blocks having the half width and the half height of the first coding block, and the partition depth of the second coding block may be increased to k+1.

The second coding block 310 with the partition depth of k+1 may be partitioned into a plurality of third coding blocks with the partition depth of k+2. Partitioning of the second coding block 310 may be performed by selectively using one of the quad tree and the binary tree depending on a partitioning method. Here, the partitioning method may be determined based on at least one of the information indicating quad tree-based partitioning or the information indicating binary tree-based partitioning.

When the second coding block 310 is partitioned based on the quad tree, the second coding block 310 may be partitioned into four third coding blocks 310a having the half width and the half height of the second coding block, and the partition depth of the third coding block 310a may be increased to k+2. In contrast, when the second coding block 310 is partitioned based on the binary tree, the second coding block 310 may be partitioned into two third coding blocks. Here, each of two third coding blocks may be a non-square block having one of the half width and the half height of the second coding block, and the partition depth may be increased to k+2. The second coding block may be determined as a non-square block of the horizontal direction or the vertical direction depending on a partitioning direction, and the partitioning direction may be determined based on the information on whether binary tree-based partitioning is performed in the vertical direction or the horizontal direction.

In the meantime, the second coding block 310 may be determined as a leaf coding block that is no longer partitioned based on the quad tree or the binary tree. In this case, the leaf coding block may be used as a prediction block or a transform block.

Like partitioning of the second coding block 310, the third coding block 310a may be determined as a leaf coding block, or may be further partitioned based on the quad tree or the binary tree.

In the meantime, the third coding block 310b partitioned based on the binary tree may be further partitioned into coding blocks 310b-2 of the vertical direction or coding blocks 310b-3 of the horizontal direction based on the binary tree, and the partition depth of the relevant coding blocks may be increased to k+3. Alternatively, the third coding block 310b may be determined as a leaf coding block 310 b-1 that is no longer partitioned based on the binary tree. In this case, the coding block 310b-1 may be used as a prediction block or a transform block. However, the above partitioning process may be limitedly performed based on at least one of the information on a size/depth of the coding block that quad tree-based partitioning is allowed, the information on the size/depth of the coding block that binary tree-based partitioning is allowed, or the information on the size/depth of the coding block that binary tree-based partitioning is not allowed.

A number of a candidate that represent a size of a coding block may be limited to a predetermined number, or the size of the coding block in a predetermined unit may have a fixed value. As an example, the size of the coding block in a sequence or in a picture may be limited to have 256×256, 128×128, or 32×32. Information indicating the size of the coding block in the sequence or in the picture may be signaled through a sequence header or a picture header.

As a result of partitioning based on a quad tree, a binary tree and a triple tree, a coding unit may be represented as square or rectangular shape of an arbitrary size.

A coding block may be encoded/decoded using at least one of a skip mode, an intra prediction, an inter prediction, or a skip method.

As another example, intra prediction or inter prediction may be performed on the same size as a coding block or a unit smaller than the coding block generated by partitioning the coding block. Once a coding block is determined, a prediction block may be determined through predictive partitioning of the coding block. The predictive partitioning of the coding block may be performed by a partition mode (Part mode) indicating a partition type of the coding block. A size or a shape of the prediction block may be determined according to the partition mode of the coding block. For example, a size of a prediction block determined according to the partition mode may be equal to or smaller than a size of a coding block.

Figure 7:
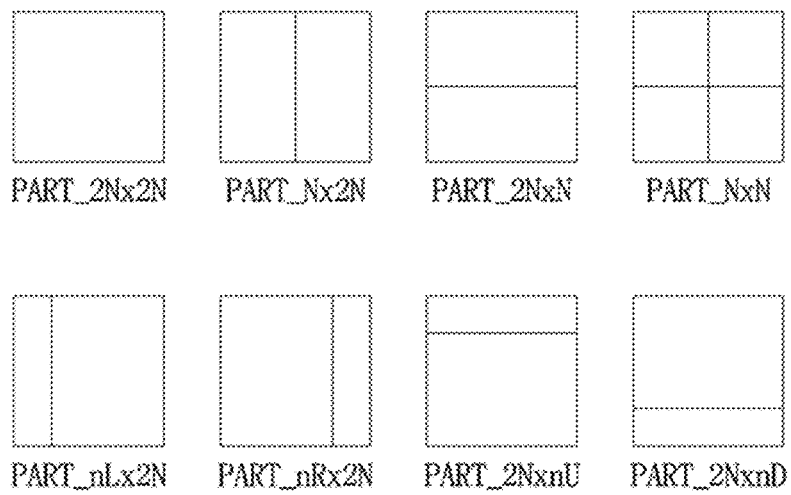
FIG. 7 is a diagram illustrating a partition mode applicable to a coding block according to an embodiment of the present invention.

FIG. 7 is a diagram illustrating a partition mode that may be applied to a coding block when the coding block is encoded by inter prediction.

Figure 4:
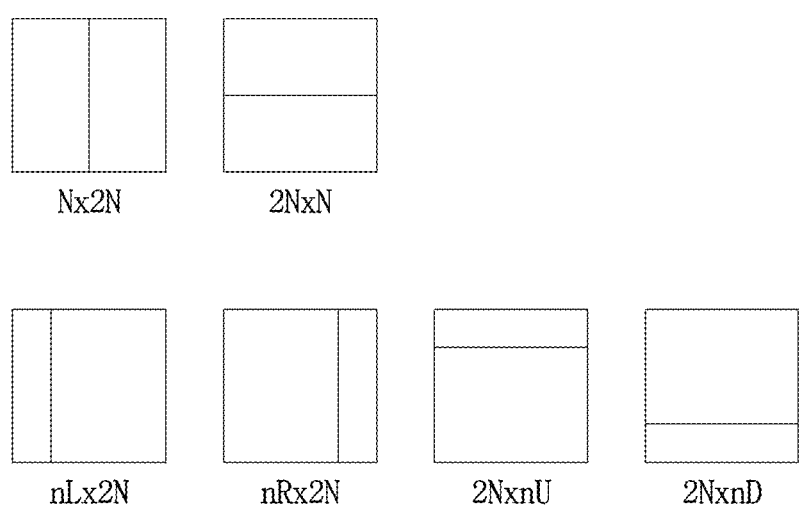
FIG. 4 is a diagram illustrating a partition type in which binary tree-based partitioning is allowed according to an embodiment of the present invention.

When a coding block is encoded by inter prediction, one of 8 partitioning modes may be applied to the coding block, as in an example shown in FIG. 4.

When a coding block is encoded by intra prediction, a partition mode PART_2N×2N or a partition mode PART_N×N may be applied to the coding block.

PART_N×N may be applied when a coding block has a minimum size. Here, the minimum size of the coding block may be pre-defined in an encoder and a decoder. Or, information regarding the minimum size of the coding block may be signaled via a bitstream. For example, the minimum size of the coding block may be signaled through a slice header, so that the minimum size of the coding block may be defined per slice.

In general, a prediction block may have a size from 64×64 to 4×4. However, when a coding block is encoded by inter prediction, it may be restricted that the prediction block does not have a 4×4 size in order to reduce memory bandwidth when performing motion compensation.

Figure 8:
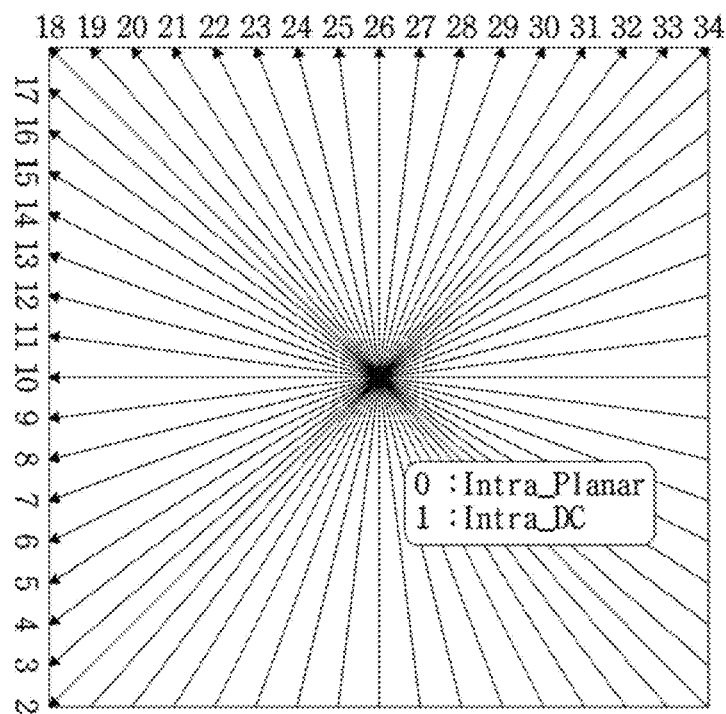
FIG. 8 is a diagram illustrating types of pre-defined intra prediction modes for a device for encoding/decoding a video according to an embodiment of the present invention.

FIG. 8 is a diagram illustrating types of pre-defined intra prediction modes for a device for encoding/decoding a video according to an embodiment of the present invention.

The device for encoding/decoding a video may perform intra prediction using one of pre-defined intra prediction modes. The pre-defined intra prediction modes for intra prediction may include non-directional prediction modes (e.g., a planar mode, a DC mode) and 33 directional prediction modes.

Alternatively, in order to enhance accuracy of intra prediction, a larger number of directional prediction modes than the 33 directional prediction modes may be used. That is, M extended directional prediction modes may be defined by subdividing angles of the directional prediction modes (M>33), and a directional prediction mode having a predetermined angle may be derived using at least one of the 33 pre-defined directional prediction modes.

Specifically, a larger number of intra prediction modes than 35 intra prediction modes shown in FIG. 8 may be used. At this time, the use of a larger number of intra prediction modes than the 35 intra prediction modes may be referred to as an extended intra prediction mode.

Figure 9:
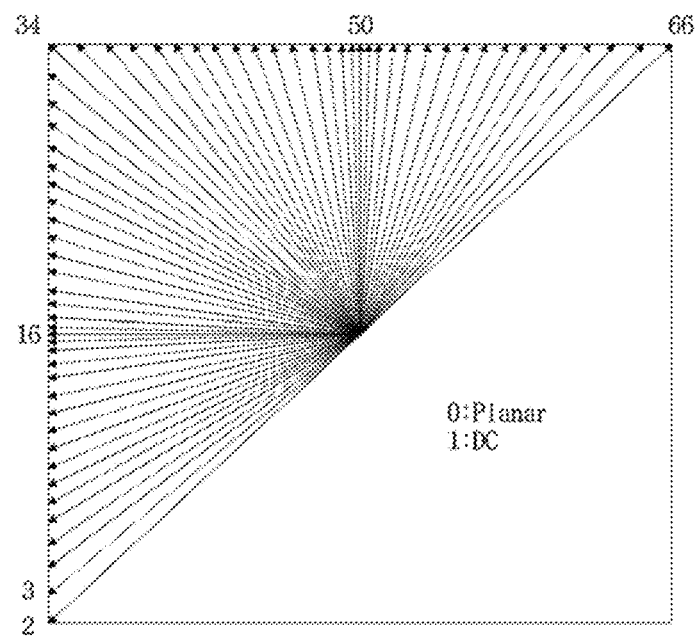
FIG. 9 is a diagram illustrating a kind of extended intra prediction modes according to an embodiment of the present invention.

FIG. 9 illustrates an example of extended intra prediction modes, and the extended intra prediction modes may include 2 non-directional prediction modes and 65 extended directional prediction modes. The same numbers of the extended intra prediction modes may be used for a luma component and a chroma component, or a different number of intra prediction modes may be used for each component. For example, 67 extended intra prediction modes may be used for the luma component, and 35 intra prediction modes may be used for the chroma component.

Alternatively, depending on the chroma format, a different number of intra prediction modes may be used in performing intra prediction. For example, in the case of the 4:2:0 format, 67 intra prediction modes may be used for the luma component to perform intra prediction and 35 intra prediction modes may be used for the chroma component. In the case of the 4:4:4 format, 67 intra prediction modes may be used for both the luma component and the chroma component to perform intra prediction.

Alternatively, depending on a size and/or shape of the block, a different number of intra prediction modes may be used to perform intra prediction. That is, depending on a size and/or shape of the PU or CU, 35 intra prediction modes or 67 intra prediction modes may be used to perform intra prediction. For example, when the CU or PU has the size less than 64×64 or is asymmetrically partitioned, 35 intra prediction modes may be used to perform intra prediction. When the size of the CU or PU is equal to or greater than 64×64, 67 intra prediction modes may be used to perform intra prediction. 65 directional intra prediction modes may be allowed for Intra 2N×2N, and only 35 directional intra prediction modes may be allowed for Intra_N×N.

A size of a block to which the extended intra prediction mode is applied may be set differently for each sequence, picture or slice. For example, it is set that the extended intra prediction mode is applied to a block (e.g., CU or PU) which has a size greater than 64×64 in the first slice. On the other hands, it is set that the extended intra prediction mode is applied to a block which has a size greater than 32×32 in the second slice. Information representing a size of a block to which the extended intra prediction mode is applied may be signaled through on the basis of a sequence, a picture, or a slice. For example, the information indicating a size of the block to which the extended intra prediction mode is applied may be defined as 'log 2_extended_intra_mode_size_minus4' obtained by taking a logarithm of the block size and then subtracting the integer 4. For example, if a value of log 2_extended_intra_mode_size_minus4 is 0, it may indicate that the extended intra prediction mode may be applied to a block having a size equal to or greater than 16×16. And if a value of log 2_extended_intra_mode_size_minus4 is 1, it may indicate that the extended intra prediction mode may be applied to a block having a size equal to or greater than 32×32.

As described above, the number of intra prediction modes may be determined in consideration of at least one of a color component, a chroma format, or a size or a shape of a block. In addition, the number of intra prediction mode candidates (e.g., the number of MPMs) used for determining an intra prediction mode of a current block to be encoded/decoded may also be determined according to at least one of a color component, a color format, or a size or a shape of a block. In addition, it is also possible to use a larger number of intra prediction modes than shown in FIG. 8. For example, by further subdividing the directional prediction modes shown in FIG. 8, it is also possible to use 129 directional prediction modes and 2 non-directional prediction modes. Whether to use a larger number of intra prediction modes than shown in FIG. 8 may be determined in consideration of at least one of the color component, the color format component, the size or the shape of the block, as in the above-described example.

Referring to the drawings to be described later, a method of determining an intra prediction mode of a current block to be encoded/decoded and a method of performing intra prediction using the determined intra prediction mode will be described with the drawings.

Figure 10:
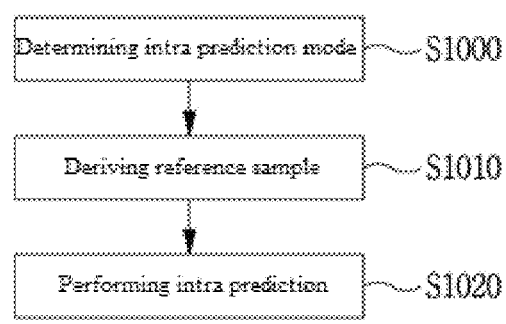
FIG. 10 is a flowchart briefly illustrating an intra prediction method according to an embodiment of the present invention.

FIG. 10 is a flowchart briefly illustrating an intra prediction method according to an embodiment of the present invention.

Referring to FIG. 10, an intra prediction mode of a current block may be determined at step S1000.

Specifically, the intra prediction mode of the current block may be derived based on a candidate list and an index. Here, the candidate list contains a plurality of candidates, and a plurality of candidates may be determined based on an intra prediction mode of the neighboring block adjacent to the current block. The neighboring block may include at least one of blocks positioned at the top, the bottom, the left, the right, or the corner of the current block. The index may specify one of a plurality of candidates in the candidate list. The candidate specified by the index may be set to the intra prediction mode of the current block.

An intra prediction mode used for intra prediction in a neighboring block may be set as a candidate. For example, candidates may be derived based on intra prediction modes of the left block, the top block, the bottom left corner neighboring block, the top right corner neighboring block, and the top left corner neighboring block of the current block. If the neighboring block is encoded by inter prediction, the candidate of the current block may be derived using the intra prediction mode of the collocated block of the neighboring block.

Also, an intra prediction mode having directionality similar to that of the intra prediction mode of the neighboring block may be set as a candidate. Here, the intra prediction mode having similar directionality may be determined by adding or subtracting a predetermined constant value to or from the intra prediction mode of the neighboring block. The predetermined constant value may be an integer, such as one, two, or more, and the predetermined constant value may be adaptively determined according to the number of usable intra prediction modes. For example, when the number of usable intra prediction modes is 35, the predetermined constant value may be set to 1, and when the number of usable intra prediction modes is 67, the predetermined constant value may be set to 2. Furthermore, when the number of usable intra prediction modes is 131, the predetermined constant value may be set to 4.

The candidate list may further include a default mode. The default mode may include at least one of a planar mode, a DC mode, the vertical mode, the horizontal mode, top right diagonal mode, or top left diagonal mode. The default mode may be adaptively added considering the maximum number of candidates that can be included in the candidate list of the current block.

The maximum number of candidates that can be included in the candidate list may be three, four, five, six, seven or more. The maximum number of candidates that can be included in the candidate list may be a fixed value preset in the device for encoding/decoding a video, or may be variably determined based on a characteristic of the current block. The characteristic may mean a location/size/shape of the block, the number/type of intra prediction modes that the block can use, a color type, a color format, etc. Alternatively, information indicating the maximum number of candidates that can be included in the candidate list may be signaled separately, and the maximum number of candidates that can be included in the candidate list may be variably determined using the information. The information indicating the maximum number of candidates may be signaled in at least one of a sequence level, a picture level, a slice level, or a block level.

Candidates included in the candidate list may be sorted in a predefined order. For example, candidates may be arranged in the candidate list in the order of the left block, the top block, the bottom left block, the top right block, and the top left block. Alternatively, the order of candidates may be variably determined according to a size or shape of the current block. For example, when the current block is a non-square block whose height is greater than the width, the intra prediction mode of the top block may be arranged with a higher priority than the intra prediction mode of the left block.

When the extended intra prediction modes and the 35 pre-defined intra prediction modes are selectively used, the intra prediction modes of the neighboring blocks may be transformed into indexes corresponding to the extended intra prediction modes, or into indexes corresponding to the 35 intra prediction modes, whereby candidates can be derived. For transform to an index, a pre-defined table may be used, or a scaling operation based on a predetermined value may be used. Here, the pre-defined table may define a mapping relation between different intra prediction mode groups (e.g., extended intra prediction modes and 35 intra prediction modes).

For example, when the left neighboring block uses the 35 intra prediction modes and the intra prediction mode of the left neighboring block is 10 (the horizontal mode), it may be transformed into an index of 16 corresponding to the horizontal mode in the extended intra prediction modes.

Alternatively, when the top neighboring block uses the extended intra prediction modes and the intra prediction mode the top neighboring block has an index of 50 (the vertical mode), it may be transformed into an index of 26 corresponding to the vertical mode in the 35 intra prediction modes.

Based on the above-described method of determining the intra prediction mode, the intra prediction mode may be derived independently for each of a luma component and a chroma component, or the intra prediction mode of the chroma component may be derived depending on the intra prediction mode of the luma component.

Specifically, the intra prediction mode of the chroma component may be determined based on the intra prediction mode of the luma component as shown in the following Table 1.

TABLE 1

| Intra_chroma_pred_mode [xCb] [yCb] | IntraPredModeY [xCb] [yCb] | | | | |
|---|---|---|---|---|---|
| | 0 | 26 | 10 | 1 | X (0 <= X < = 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 | 0 | 26 | 10 | 1 | X |

In Table 1, intra_chroma_pred_mode means information signaled to specify the intra prediction mode of the chroma component, and IntraPredModeY indicates the intra prediction mode of the luma component.

When a candidate list is determined, information indicating whether the same candidate as an intra prediction mode of the current block is included in the candidate list may be decoded. When the information indicates that the same candidate as the intra prediction mode of the current block is included in the candidate list, index information (e.g., MPM_index) indicating any one of candidates may be decoded. The intra prediction mode of the current block may be set to be the same as an intra prediction mode of a candidate indicated by the index information.

On the other hand, when the information indicates that the same candidate as the intra prediction mode of the current block is not included in the candidate list, remaining intra prediction mode information (e.g., rem_intra_mode) specifying any one of remaining intra prediction modes except candidates may be decoded. The intra prediction mode of the current block may be determined based on an intra prediction mode indicated by the remaining intra prediction mode information. For example, the current intra prediction mode may be determined by comparing a candidate with the intra prediction mode indicated by the remaining intra prediction mode. For example, when an intra prediction mode of the candidate is smaller than the intra prediction mode indicated by the remaining intra prediction mode, 1 may be added to the remaining intra prediction mode to derive the intra prediction mode of the current block.

Referring to FIG. 10, a reference sample for intra prediction of the current block may be derived at step S1010.

Specifically, a reference sample for intra prediction may be derived based on a neighboring sample of the current block. The neighboring sample may be a reconstructed sample of the neighboring block, and the reconstructed sample may be a reconstructed sample before an in-loop filter is applied or a reconstructed sample after the in-loop filter is applied.

A neighboring sample reconstructed before the current block may be used as the reference sample, and a neighboring sample filtered based on a predetermined intra filter may be used as the reference sample. Filtering of neighboring samples using an intra filter may also be referred to as reference sample smoothing. The intra filter may include at least one of the first intra filter applied to a plurality of neighboring samples positioned on the same horizontal line or the second intra filter applied to a plurality of neighboring samples positioned on the same vertical line. Depending on the positions of the neighboring samples, one of the first intra filter and the second intra filter may be selectively applied, or both intra filters may be applied. At this time, at least one filter coefficient of the first intra filter or the second intra filter may be (1, 2, 1), but is not limited thereto.

The filtering may be adaptively performed based on at least one of the intra prediction mode of the current block or a size of the transform block for the current block. For example, when the intra prediction mode of the current block is the DC mode, the vertical mode, or the horizontal mode, filtering may not be performed. When the size of the transform block is N×M, filtering may not be performed. Here, N and M may be the same values or different values, or may be values of 4, 8, 16, or more. For example, if the size of the transform block is 4×4, filtering may not be performed. Alternatively, filtering may be selectively performed based on the result of a comparison of a pre-defined threshold and the difference between the intra prediction mode of the current block and the vertical mode (or the horizontal mode). For example, when the difference between the intra prediction mode of the current block and the vertical mode is greater than the threshold, filtering may be performed. The threshold may be defined for each size of the transform block as shown in Table 2.

TABLE 2

| | 8 × 8 transform | 16 × 16 transform | 32 × 32 transform |
|---|---|---|---|
| Threshold | 7 | 1 | 0 |

The intra filter may be determined as one of a plurality of intra filter candidates pre-defined in the device for encoding/decoding a video. To this end, a separate index specifying an intra filter of the current block among a plurality of intra filter candidates may be signaled. Alternatively, the intra filter may be determined based on at least one of a size/shape of the current block, a size/shape of the transform block, the information about the filter strength, or the variation of surrounding samples.

The intra prediction on a current coding block may be performed by using a plurality of reference sample lines. For example, it may be performed by using two or more reference sample lines.

Whether to perform an intra prediction using a plurality of reference sample lines may be determined based on a size/shape of the current block, an intra prediction mode, or the like. For example, when an intra prediction mode of a current block is a non-directional intra prediction mode or an intra prediction mode in a specific direction, performing the intra prediction using a plurality of reference sample lines may be limited. Herein, the specific direction may include the vertical direction, the horizontal direction, or the diagonal direction.

Referring to FIG. 10, intra prediction may be performed using the intra prediction mode of the current block and the reference sample at step S1020.

That is, the prediction sample of the current block may be obtained using the intra prediction mode determined at step S1000 and the reference sample derived at step S1010. When intra prediction is performed using a plurality of reference sample lines, a prediction sample may be obtained based on a weighted sum of reference samples belonging to different reference sample lines. For example, the prediction sample may be derived based on a weighted sum of the first reference sample belonging to the first reference sample line and the second reference sample belonging to the second reference sample line. In this case, the weight applied to the first reference sample and the second reference sample may have the same value or may have different values depending on the distance from the prediction target sample. For example, a higher weight may be given to a reference sample that is close to the prediction target sample among the first reference sample and the second reference sample.

However, in the case of intra prediction, a boundary sample of the neighboring block may be used, and thus quality of the prediction picture may be decreased. Therefore, a correction process may be performed on the prediction sample generated through the above-described prediction process, and will be described in detail with reference to FIG. 11. However, the correction process is not limited to being applied only to the intra prediction sample, and may be applied to an inter prediction sample or the reconstructed sample.

Figure 11:
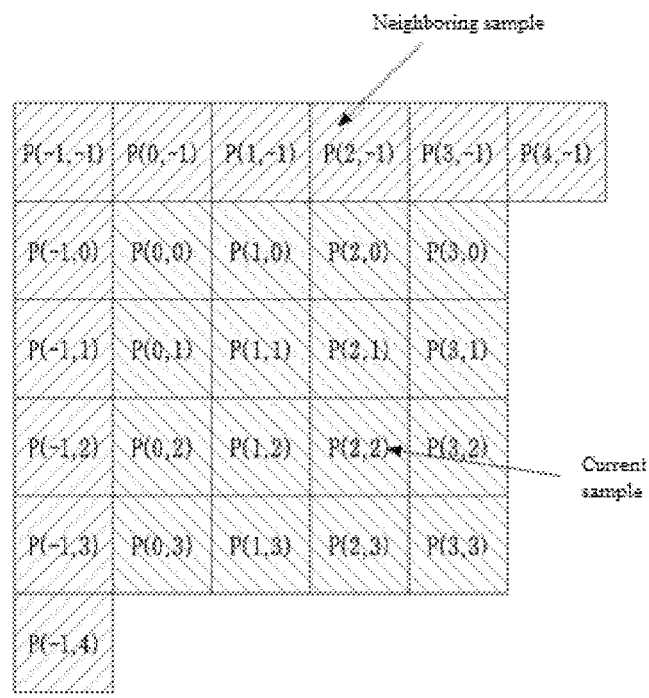
FIG. 11 is a diagram illustrating a method of correcting a prediction sample of a current block based on differential information of neighboring samples according to an embodiment of the present invention.

FIG. 11 is a diagram illustrating a method of correcting a prediction sample of a current block based on differential information of neighboring samples according to an embodiment of the present invention.

The prediction sample of the current block may be corrected based on the differential information of a plurality of neighboring samples for the current block. The correction may be performed on all prediction samples in the current block, or may be performed on prediction samples in predetermined partial regions. The partial regions may be one row/column or a plurality of rows/columns, and these may be preset regions for correction in the device for encoding/decoding a video. For example, correction may be performed on a one row/column located at a boundary of the current block or may be performed on a plurality of rows/columns from the boundary of the current block. Alternatively, the partial regions may be variably determined based on at least one of a size/shape of the current block or an intra prediction mode.

The neighboring samples may belong to the neighboring blocks positioned at the top, the left, and the top left corner of the current block. The number of neighboring samples used for correction may be two, three, four, or more. The positions of the neighboring samples may be variably determined depending on the position of the prediction sample which is the correction target in the current block. Alternatively, some of the neighboring samples may have fixed positions regardless of the position of the prediction sample which is the correction target, and the remaining neighboring samples may have variable positions depending on the position of the prediction sample which is the correction target.

The differential information of the neighboring samples may mean a differential sample between the neighboring samples, or may mean a value obtained by scaling the differential sample by a predetermined constant value (e.g., one, two, three, or the like.). Here, the predetermined constant value may be determined considering the position of the prediction sample which is the correction target, the position of a column or a row including the prediction sample which is the correction target, the position of the prediction sample within the column, the row, or the like.

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample as shown in Equation 1.

$$P'(0,y)=P(0,y)+((p(-1,y)-p(-1,-1))\gg 1 \text{ for } y=0 \ldots N-1 \quad \text{[Equation 1]}$$

For example, when the intra prediction mode of the current block is the horizontal mode, differential samples between the top left neighboring sample $p(-1, -1)$ and neighboring samples $p(x, -1)$ adjacent to the top boundary of the current block may be used to obtain the final prediction sample as shown in Equation 1.

$$P'(x,0)=p(x,0)+((p(x,-1)-p(-1,-1))\gg 1 \text{ for } x=0 \ldots N-1 \quad \text{[Equation 2]}$$

For example, when the intra prediction mode of the current block is the vertical mode, differential samples between the top left neighboring sample $p(-1, -1)$ and neighboring samples $p(-1, y)$ adjacent to the left boundary of the current block may be used to obtain the final prediction sample as shown in Equation 2. Here, the differential sample may be added to the prediction sample, or the differential sample may be scaled by a predetermined constant value, and then added to the prediction sample. The predetermined constant value used in scaling may be determined differently depending on the column and/or row. For example, the prediction sample may be corrected as shown in Equation 3 and Equation 4.

$$P'(0,y)=P(0,y)+((p(-1,y)-p(-1,-1))\gg 1 \text{ for } y=0 \ldots N-1 \quad \text{[Equation 3]}$$

$$P'(1,y)=P(1,y)+((p(-1,y)-p(-1,-1))\gg 2 \text{ for } y=0 \ldots N-1 \quad \text{[Equation 4]}$$

For example, when the intra prediction mode of the current block is the horizontal mode, differential samples between the top left neighboring sample $p(-1, -1)$ and neighboring samples $p(x, -1)$ adjacent to the left boundary of the current block may be used to obtain the final prediction sample. This is as described above in the horizontal mode. For example, the prediction samples may be corrected as in Equations 5 and 6 below.

$$P'(x,0)=p(x,0)+((p(x,-1)-p(-1,-1))\gg 1 \text{ for } x=0 \ldots N-1$$ [Equation 5]

$$P'(x,1)=p(x,1)+((p(x,-1)-p(-1,-1))\gg 2 \text{ for } x=0 \ldots N-1$$ [Equation 6]

When an intra prediction mode of a current block is a directional prediction mode, intra prediction of the current block may be performed based on the directionality of the directional prediction mode. For example, Table 3 shows an intra direction parameter intraPredAng from Mode 2 to Mode 34, which is the directional intra prediction mode illustrated in FIG. 8.

TABLE 3

| | predModeIntra | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 |
| intraPredAng | — | 32 | 26 | 21 | 17 | 13 | 9 | 5 | 2 | 0 | −2 | −5 | −9 | −13 | −17 | −21 |
| | predModeIntra | | | | | | | | | | | | | | |
| | 18 | 19 | 20 | 21 | 22 | 23 | 24 | 25 | 26 | 27 | 28 | 29 | 30 | 31 | 32 | 33 |
| intraPredAng | −32 | −26 | −21 | −17 | −13 | −9 | −5 | −2 | 0 | 2 | 5 | 9 | 13 | 17 | 21 | 26 |

In Table 3, 33 directional intra prediction modes have been described by way of example, but more or fewer directional intra prediction modes may be defined.

An intra direction parameter for a current block may be determined based on a lookup table that defines a mapping relationship between a directional intra prediction mode and an intra direction parameter. Alternatively, the intra direction parameter for the current block may be determined based on the information signaled through the bitstream.

Intra prediction of the current block may be performed using at least one of the left reference sample or the top reference sample, depending on the directionality of the directional intra prediction mode. Here, the top reference sample may be a reference sample (e.g., (−1, −1) to (2W−1, −1)) having a y-axis coordinate smaller than the prediction target sample (x, 0) included in the top row in the current block, and the left reference sample may be a reference sample (e.g., (−1, −1) to (−1, 2H−1)) having x-axis coordinates smaller than the prediction target sample (0, y) included in the leftmost column in the current block.

Depending on a directionality of an intra prediction mode, reference samples of the current block may be arranged in one dimension. Specifically, when both the top reference sample and the left reference sample should be used for intra prediction of the current block, it is assumed that they are arranged in a line along the vertical or horizontal direction, and reference samples of each prediction target sample may be selected.

For example, in the case where the intra direction parameter is negative (e.g., the intra prediction mode corresponding to Mode 11 to Mode 25 in Table 3), the top reference samples and the left reference samples may be rearranged along the horizontal or vertical direction to form a one-dimensional reference sample group P_ref_1D.

Figure 12:
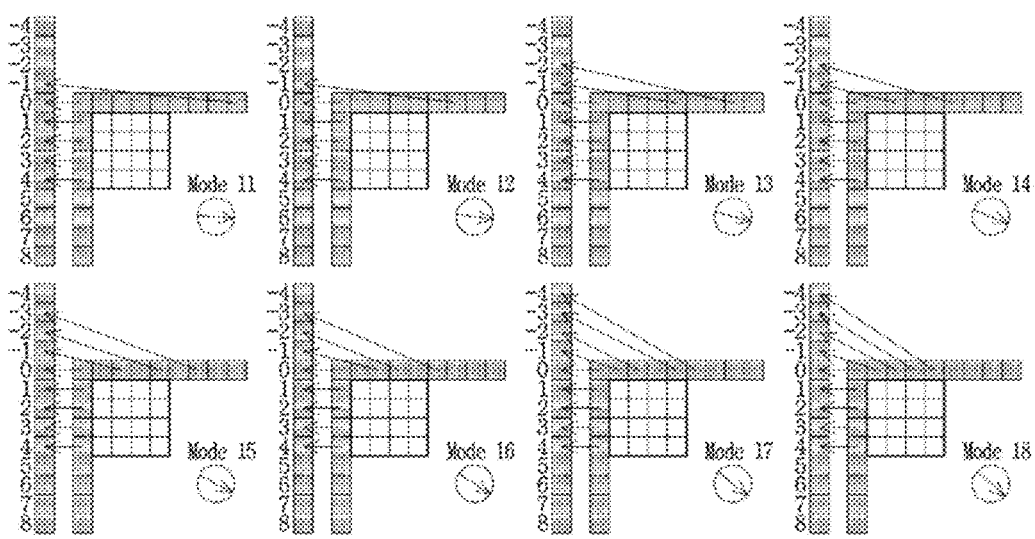
FIGS. 12 and 13 are diagrams illustrating a one-dimensional reference sample group in which reference samples are rearranged in a line.
Figure 13:
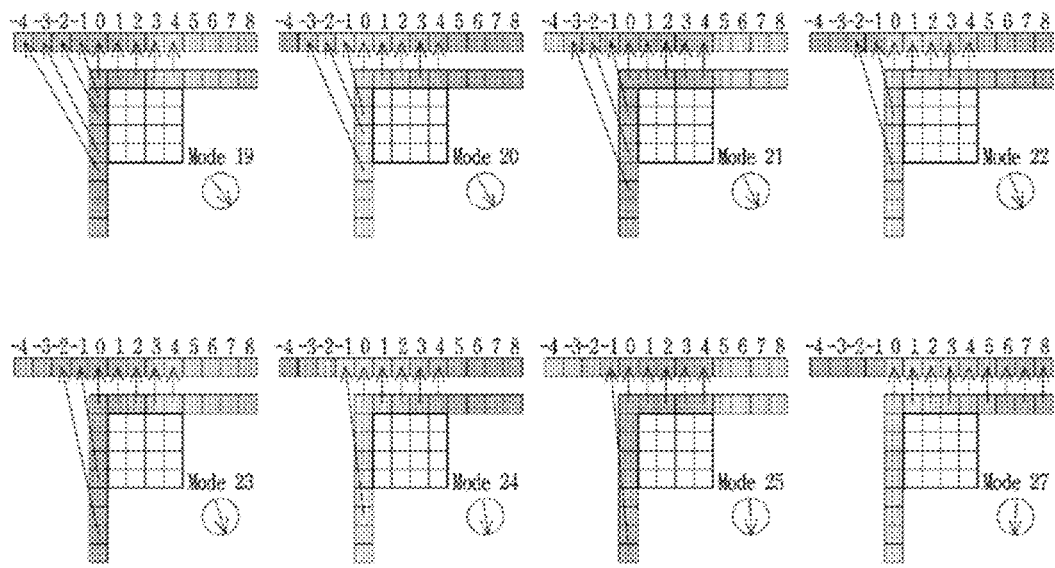

FIGS. 12 and 13 are a diagram illustrating a one-dimensional reference sample group in which reference samples are rearranged in a line.

Whether to rearrange the reference samples in the vertical direction or in the horizontal direction may be determined according to a directionality of an intra prediction mode. For example, if the intra prediction mode index is between 11 and 18, as in an example shown in FIG. 12, the top reference samples of a current block can be rotated counterclockwise to generate a one-dimensional reference sample group in which the left reference samples and the top reference samples are arranged in the vertical direction.

On the other hand, if the intra prediction mode index is between 19 and 25, as in an example shown in FIG. 13, the left reference samples of the current block may be rotated clockwise to generate a one-dimensional reference sample group in which the left reference samples and the top reference samples are arranged in the horizontal direction.

If the intra direction parameter of the current block is not negative, intra prediction for the current block may be performed using only the left reference samples or the top reference samples. Accordingly, for the intra prediction modes in which the intra direction parameter is not negative, the one-dimensional reference sample group may be generated using only the left reference sample or the top reference samples.

Based on the intra direction parameter, a reference sample determination index iIdx for specifying at least one reference sample used to predict the prediction target sample may be derived. In addition, a weight related parameter ifact used to determine a weight applied to each reference sample based on the intra direction parameter may be derived. For example, Equations 7 and 8 illustrate examples of deriving reference sample determination index and weight related parameter $$iIdx=(y+1)*(P_{ang}/32)$$

$$ifact=[(y+1)*P_{ang}]31$$ [Equation 7]

As shown in Equation 7, iIdx and ifact are variably determined according to the slope of the directional intra prediction mode. In this case, the reference sample specified by iIdx may correspond to an integer pel.

Based on a reference sample determination index, at least one reference sample may be specified for each prediction sample. For example, the position of the reference sample in the one-dimensional reference sample group for predicting the prediction target sample in the current block may be specified based on the reference sample determination index. Based on the reference sample at the specified position, a prediction image (i.e., a prediction sample) for the prediction target sample may be generated.

Considering an intra prediction mode of a current block, if a prediction target sample can be predicted with only one reference sample, the prediction image of the prediction target sample may be generated based on the reference sample specified by the intra prediction mode of the current block.

For example, when an imaginary angular line according to the angle or the slope of the intra prediction mode crosses an integer pel (i.e., a reference sample at an integer position) the one-dimensional reference sample group, by copying the reference sample at the integer pel position or considering the position between the reference sample at the integer pel position and the prediction target sample, the prediction image of the prediction target sample may be generated. For example, the following Equation 8 illustrates an example of generating the prediction image P(x, y) for the prediction target sample by copying the reference sample P_ref_1D(x+iIdx+1) in the one-dimensional reference sample group specified by the intra prediction mode of the current block.

$$P(x,y)=P\_ref\_1D(x+i\text{Idx}+1) \quad \text{[Equation 8]}$$

In consideration of an intra prediction mode of a current block, when it is determined that a prediction target sample is not predicted with only one reference sample, a plurality of reference samples may be used to perform prediction on the prediction target sample. Specifically, according to the intra prediction mode of the current block, the prediction target sample may be predicted by performing linear interpolation or tap filter based interpolation on the reference sample at a predetermined position and neighboring reference samples neighboring the reference sample at a predetermined position. The number of taps of the interpolation filter may be two or more natural numbers. Specifically, the number of taps of the tap filter may be an integer of 2, 3, 4, 5, 6, or more, depending on the number of reference samples to be interpolated.

For example, an imaginary angular line according to the angle of the intra prediction mode or the slope of the intra prediction mode does not cross the integer pel (i.e., the reference sample at the integer position) in the one-dimensional reference sample group, a prediction image of a prediction target sample may be generated by interpolating a reference sample placed on a corresponding angle line and a reference sample adjacent to the left/right or up/down of the reference sample. For example, the following Equation 9 illustrates an example of generating a prediction sample P(x, y) for a prediction target sample by interpolating two or more reference samples.

$$P(x,y)=(32-i_{fact})/32*P\_ref\_1D(x+i\text{Idx}+1)+i_{fact}/32*P\_ref\_1D(x+i\text{Idx}+2) \quad \text{[Equation 9]}$$

A coefficient of an interpolation filter may be determined based on a weight related parameter ifact. As an example, the coefficient of the interpolation filter may be determined based on the distance between the fractional pel and the integer pel (i.e., the integer position of each reference sample) located on an angular line.

The following Equation 10 illustrates a case where a tap number of a tap filter is 4.

$$P(x,y)=f(0)*P\_ref\_1D(x+i\text{Idx}-1)+f(1)*P\_ref\_1D(x-i\text{Idx})-f(2)*P\_ref\_1D(x+i\text{Idx}+1)+f(3)*P\_ref\_1D(x+i\text{Idx}+2) \quad \text{[Equation 10]}$$

When using a multi-tap filter, a sample at a position that does not correspond to the left reference sample or the top reference sample may be replaced with the nearest reference sample at that position. As an example, in Equation 9, when a sample at the position P_ref_1D (x+iIdx−1) does not correspond to the top reference sample, the sample may be replaced with a reference sample at the position P_ref_1D (x+idx). Alternatively, when a sample at the P_ref_1D(x+iIdx+2) position does not correspond to the top reference sample, the sample may be replaced with a reference sample at the P_ref_1D (x+iIdx+1) position.

The multi-tap filter can be applied to a plurality of reference samples arranged in a line along the horizontal or vertical direction. Alternatively, the multi-tap filter may be applied to a predetermined polygonal shape such as a rectangle. A shape to which the multi-tap filter is applied may be variably determined according to a size, shape, or intra prediction mode of the current block.

As shown in Equations 8 to 10, generating a prediction sample by interpolating a reference sample using the directionality of intra prediction may be referred to as an intra prediction sample interpolation technique.

In using the intra prediction sample interpolation technique, a large tap number of tap filters does not necessarily guarantee an improvement in prediction accuracy. For example, when a size of the current block is an asymmetric coding unit that one of the height or width is significantly larger than the other, such as 2×16, or a block of small size, such as 4×4, using a tap filter of 4 taps or more may result in excessive smoothing of the prediction image. Accordingly, a type of tap filter may be adaptively determined according to a size, shape, or intra prediction mode of the current block. Here, a type of tap filter may be classified by at least one of a number of taps, filter coefficients, filter strength (strong/weak), or filtering direction. The number of filter taps or the filter coefficient may be variably determined according to the filter strength. In addition, depending on the type of the tap filter, an application direction of the tap filter, such as horizontal interpolation, vertical interpolation, or horizontal and vertical interpolation, may be determined. The application direction of the tap filter may be variably set on the basis of lines (rows or columns) or samples in the current block.

Specifically, the type of tap filter to be used may be determined based on the width or height of a current block. As an example, when at least one of the width or height of the current block is smaller than a predefined value, an intra prediction sample interpolation technique may be performed by using a 2-tap filter instead of a 4-tap filter. On the other hand, when both the width and height of the current block is greater than or equal to the predetermined value, the intra prediction sample interpolation technique may be performed using the 4-tap filter. Here, the predefined value may represent a value such as 4, 8, or 16.

Alternatively, the type of tap filter to be used may be determined according to whether the width and height of the current block are the same. For example, when the width and height of the current block are different values, the intra prediction sample interpolation technique may be performed using the 2-tap filter instead of the 4-tap filter. On the other hand, when the width and height of the current block have the same value, the intra prediction sample interpolation technique may be performed using the 4-tap filter.

Alternatively, the type of tap filter to be used may be determined according to the ratio of the width and the height of the current block. For example, when the ratio of the width (w) to the height (h) of the current block (i.e., w/h or h/w) is less than a predefined threshold, the intra prediction sample interpolation technique may be performed using the 2-tap filter instead of the 4-tap filter On the other hand, when the ratio of the width and height of the current block is greater than or equal to the predefined threshold value, the intra prediction sample interpolation technique may be performed using the 4-tap filter.

Alternatively, the type of tap filter may be determined according to an intra prediction mode, a shape, or a size of the current block. For example, when the current block is a 2×16 type coding unit and the intra prediction mode of the current block is an intra prediction mode belonging to the horizontal range, the intra prediction sample interpolation technique may be performed using a tap filter having a tap number n. On the other hand, when the current block is a 2×16 type coding unit and the intra prediction mode of the current block is an intra prediction mode belonging to the vertical direction range, the intra prediction sample interpolation technique may be performed using a tap filter having a tap number m.

On the other hand, when the current block is a 16×2 type coding unit and the intra prediction mode of the current block is the intra prediction mode belonging to the horizontal direction range, the intra prediction sample interpolation technique may be performed using a tap filter having a tap number n. On the other hand, when the current block is a 16×2 type coding unit and the intra prediction mode of the current block is the intra prediction mode belonging to the vertical direction range, the intra prediction sample interpolation technique may be performed using a tap filter having a tap number m.

Here, the horizontal range may indicate a predetermined range including the intra prediction mode in the horizontal direction, and the vertical range may indicate a predetermined range including the intra prediction mode in the vertical direction. For example, based on 35 intra prediction modes, the horizontal direction range may indicate an intra prediction mode between modes 11 and 18, and the vertical direction range may indicate an intra prediction mode between modes 19 and 27.

In addition, n and m are constants greater than 0, and n and m may have different values. Alternatively, n and m may be set to have the same value, but at least one of filter coefficients or filter intensities of the n tap filter and the m tap filter may be set differently.

When using a directional prediction mode or a DC mode, there may be a problem in that image quality deterioration occurs at a block boundary. On the other hand, in a planar mode, the image quality deterioration of the block boundary is relatively smaller than those prediction modes.

The planar prediction may be performed by generating a first prediction image in a horizontal direction and a second prediction image in a vertical direction by using reference samples, and then performing weighted prediction for the first prediction image and the second prediction image.

Herein, the first prediction image may be generated based on reference samples adjacent to the current block placed in a horizontal direction of a prediction target sample. As an example, the first prediction image may be generated based on a weighted sum of reference samples placed in a horizontal direction of the prediction target sample. In this case, a weight applied to each reference sample may be determined in consideration of a distance to the prediction target sample or a size of the current block. Samples placed in a horizontal direction may comprise a left reference sample on the same horizontal line as the prediction target sample (that is, a left reference sample having the same y coordinate as the prediction target sample) and a right reference sample on the same horizontal line as the prediction target sample (that is, a right reference sample having the same y coordinate as the prediction target sample). In this case, the right reference sample may be derived from a top reference sample of the current block. For example, the right reference sample may be derived by copying a value of the top reference sample placed on the same vertical line as the right reference sample, or may be derived as a weighted sum or an average value of a plurality of top reference samples. Herein, the top reference sample placed on the same vertical line as the right reference sample may include a reference sample adjacent to a top right corner of the current block (that is, the top reference sample having the same x coordinate as the right reference sample). Alternatively, depending on a shape, a size of the current block, or a position of the prediction target sample, a position of the top reference sample used to derive the right reference sample may be determined differently.

A second prediction image may be generated based on reference samples adjacent to the current block placed in a vertical direction of a prediction target sample. As an example, the second prediction image may be generated based on a weighted sum of reference samples placed in the vertical direction of the prediction target sample. In this case, a weight applied to each reference sample may be determined in consideration of a distance to the prediction target sample or a size of the current block. Samples placed in the vertical direction may comprise a top reference sample on the same vertical line as the prediction target sample (that is, a top reference sample having the same x coordinate as the prediction target sample) and a bottom reference sample on the same vertical line as the prediction target sample (that is, a bottom reference sample having the same x coordinate as the prediction target sample). In this case, the bottom reference sample may be derived from a left reference sample of the current block. For example, the bottom reference sample may be derived by copying a value of the left reference sample placed on the same horizontal line as the bottom reference sample, or may be derived as a weighted sum or an average value of a plurality of left reference samples. Herein, the left reference sample placed on the same horizontal line as the bottom reference sample may include a reference sample adjacent to a bottom left corner of the current block (that is, the left reference sample having the same y coordinate as the bottom reference sample). Alternatively, depending on a shape, a size of the current block, or a position of the prediction target sample, a position of the top reference sample used to derive the bottom reference sample may be determined differently.

Alternatively, both the left reference sample and the top reference sample may be used to derive at least one of the right reference sample or the bottom reference sample.

As an example, a weighted sum or an average of the top reference sample and the left reference sample of the current block may be determined as a value of at least one of the right reference sample or the bottom reference sample.

Alternatively, the bottom left reference sample and the top right reference sample may be used to derive a bottom right reference sample adjacent to a bottom right corner of the current block, and then the derived bottom right reference sample may be used to derive the right reference sample and the bottom reference sample. The bottom right reference sample may be derived based on a weighted sum or an average of the top right reference sample and the left reference sample of the current block. In this case, weights applied to the top right reference sample and the left reference sample may have the same value or may be determined based on a width/height of the current block.

Once the bottom right reference sample is determined, the right reference sample may be derived by interpolating the bottom right reference sample and the top right reference sample, and the bottom reference sample may be derived by interpolating the bottom right reference sample and the bottom left reference sample. In this case, coefficients of an interpolation filter may be determined based on a size of the current block, a shape of the current block, a distance to the bottom right reference sample, a distance to the top right reference sample, or a distance to the bottom left reference sample.

In order to derive the right reference sample or the left reference sample, a reference sample of a fixed position may be used, or a reference sample that is adaptively selected according to a position of a prediction target sample may be used. For example, the right reference sample may be derived by using the top right reference sample irrespective of the position of the prediction target sample, or may be derived by using a left reference sample selected according to the position of the prediction target sample (e.g., reference sample having the same y-axis coordinate as the prediction target sample) or a top reference sample selected according to the position of the prediction target sample (e.g., reference sample having the same x-axis coordinate as the prediction target sample). Alternatively, the bottom reference sample may be derived using the bottom left reference sample regardless of the position of the prediction target sample, or may be derived using a left reference sample selected according to the position of the prediction target sample (e.g., reference sample having the same y-axis coordinate as the prediction target sample) or a top reference sample selected according to the position of the prediction target sample (e.g., reference sample having the same x-axis coordinate as the prediction target sample).

Figure 14A:
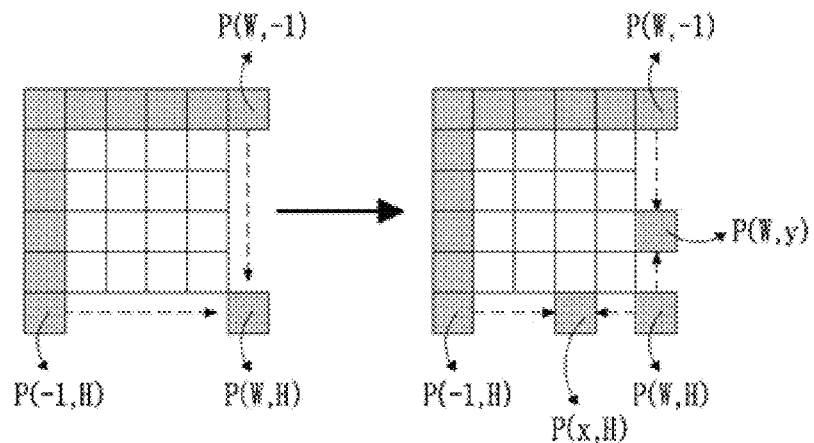
FIGS. 14A and 14B are diagrams illustrating an example of deriving a right reference sample or a bottom reference sample using a plurality of reference samples.
Figure 14B:
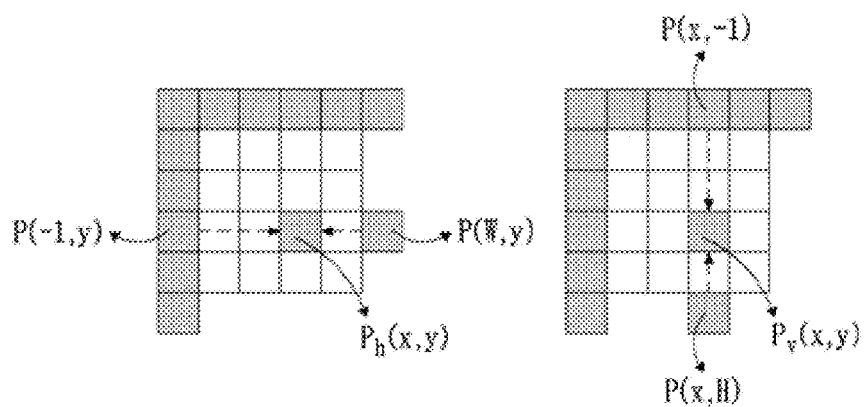

FIGS. 14A and 14B are diagrams illustrating an example of deriving a right reference sample or a bottom reference sample using a plurality of reference samples. Assume that the current block is a block having a size of W×H.

Referring to FIG. 14A, first, based on a weighted sum or an average value of a top right reference sample P(W, −1) and a bottom left sample P(−1, H) of the current block, a bottom right reference samples P(W, H) may be generated. In this case, weights applied to the top right reference sample and the left reference sample may be set equally or determined based on a width W and a height H of the current block. For example, when the current block is non-square, a weight applied to the top right reference sample may be determined as W/(W+H), and a weight applied to the bottom left reference sample may be determined as H/(W+H).

Furthermore, a right reference sample P(W, y) for a prediction target sample (x, y) may be generated based on the bottom right reference sample P(W, H) and the top right reference sample P(W, −1). For example, the right prediction sample P(W, y) may be calculated as a weighted sum or an average value of the bottom right reference sample P(W, H) and the top right reference sample P(W, −1). In addition, a bottom reference sample P(x, H) for the prediction target sample (x, y) may be generated based on the bottom right reference sample P(W, H) and the bottom left reference sample P(−1, H). For example, the bottom reference sample P(x, H) may be calculated as a weighted sum or an average value of the bottom right reference sample P(W, H) and the left reference sample P(−1, H).

As shown in FIG. 14B, when the right reference sample and the bottom reference sample are generated, a first prediction sample $P_h(x, y)$ and a second prediction sample $P_v(x, y)$ of the prediction target sample may be generated by using the generated reference samples. In this case, the first prediction sample $P_h(x, y)$ may be generated based on a weighted sum of the left reference sample P(−1, y) and the right reference sample P(W, y), and the second prediction sample $P_v(x, y)$ may be generated based on a weighted sum of the top reference sample P(x, −1) and the bottom reference sample P(x, H).

Figure 15:
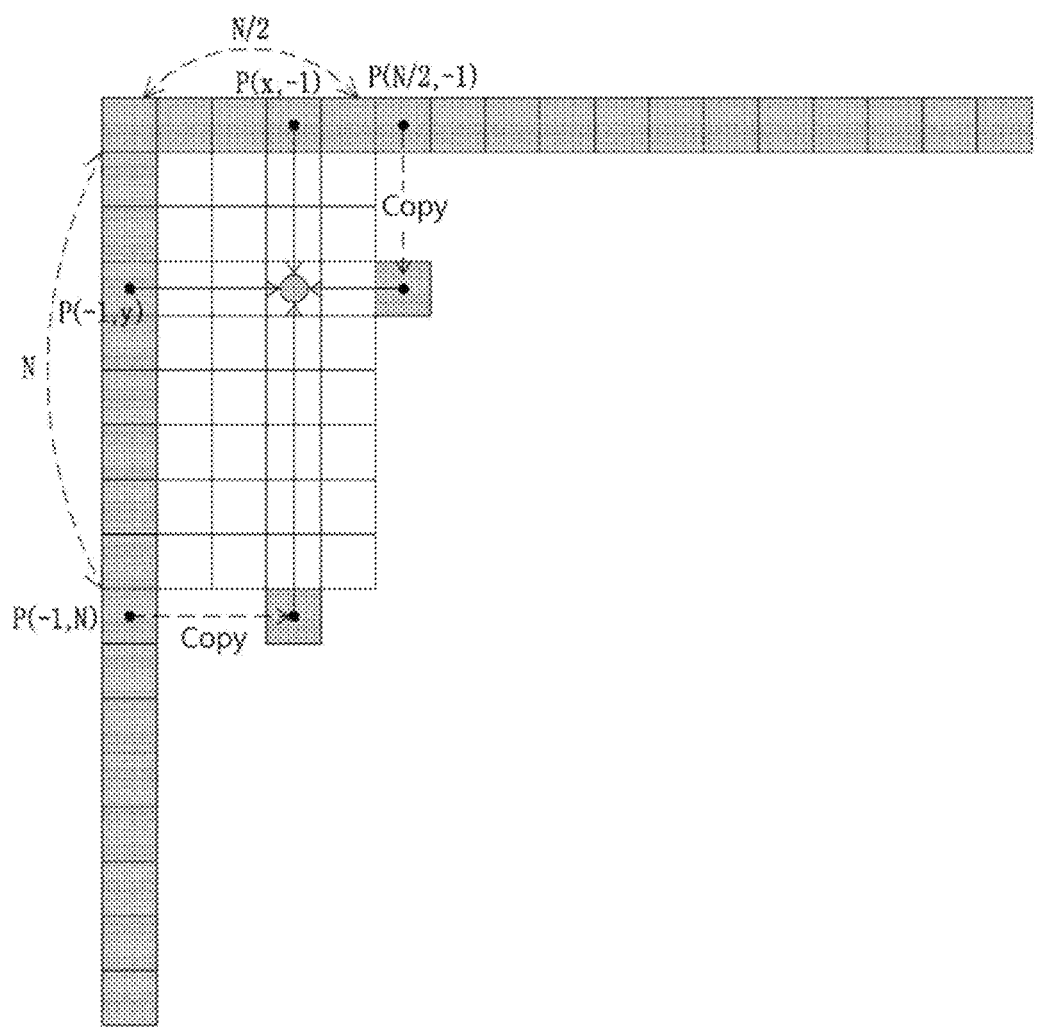
FIGS. 15 and 16 are diagrams for explaining determining a right reference sample and a bottom reference sample for a non-square block according to an embodiment of the present invention.
Figure 16:
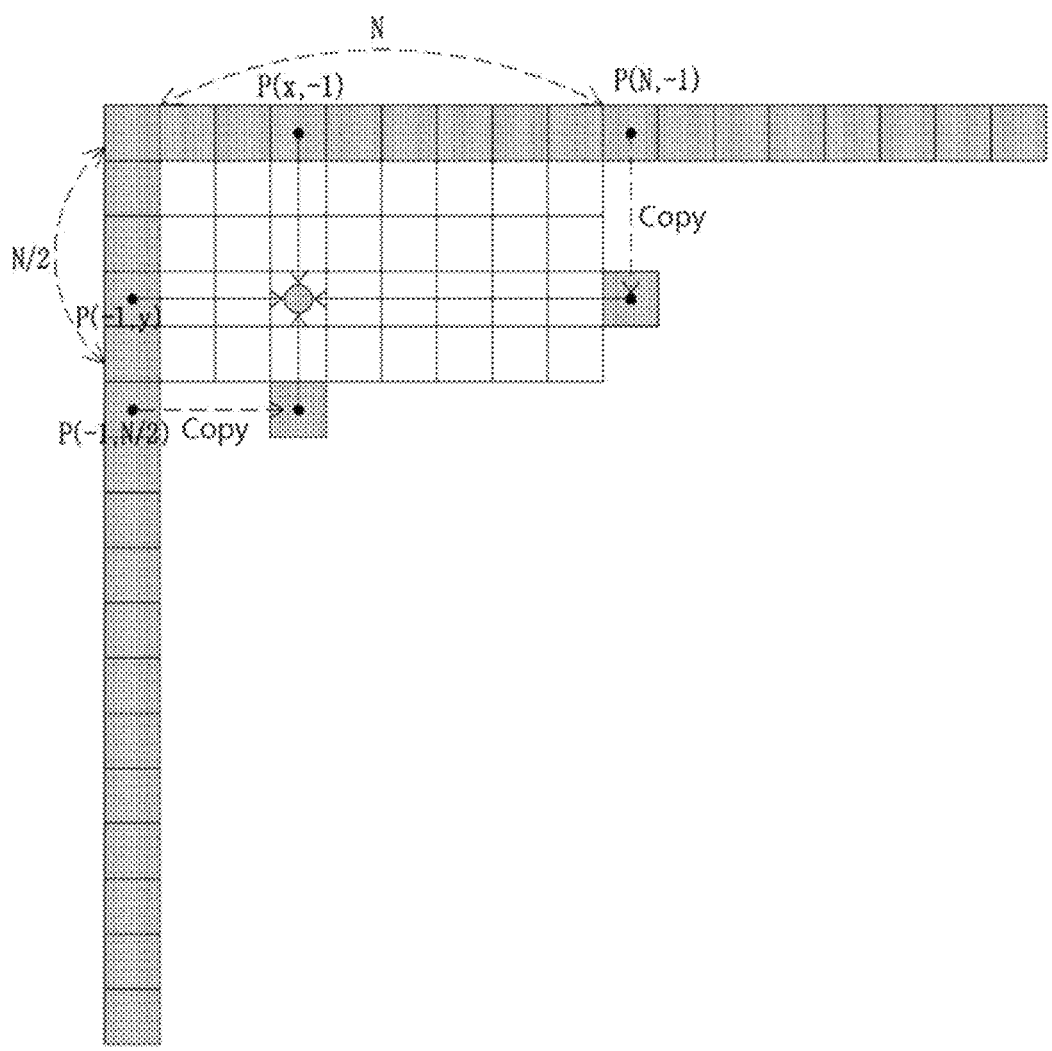

FIGS. 15 and 16 are diagrams for explaining determining a right reference sample and a bottom reference sample for a non-square block according to an embodiment of the present invention.

As in an example shown in FIG. 15, when the current block is a non-square block of (N/2)×N, a right reference sample may be derived based on a top right reference sample P(N/2, −1), and a bottom reference sample may be derived based on a bottom left reference sample P(−1, N).

Alternatively, the right reference sample or the bottom reference sample may be derived based on at least one of a weighted sum, an average, a minimum, or a maximum value of the top right reference sample P(N/2, −1) and the bottom left reference sample P(−1, N). For example, the right reference sample may be derived based on a weighted sum or an average of P(N/2, −1) and P(−1, N), or may be derived by interpolating a bottom right reference sample and the top right reference sample. After deriving the bottom right reference sample P(N/2, N) based on P(N/2, −1) and P(−1, N). Alternatively, the bottom reference sample may be derived based on a weighted sum or an average of P(N/2, −1) and P(−1, N), or may be derived by interpolating the bottom right reference sample and the bottom left reference sample after deriving the bottom right reference sample P(N/2, N) based on P(N/2, −1) and P(−1, N).

On the other hand, as in an example shown in FIG. 16, when the current block is a non-square block of N×(N/2), a right reference sample may be derived based on a top right reference sample P(N, −1), a bottom reference sample may be derived based on a bottom left reference sample P(−1, N/2).

Alternatively, a right reference sample or a bottom reference sample may be derived based on at least one of a weighted sum, an average, a minimum, or a maximum value of a he top left reference sample P(N, −1) and a bottom left reference sample P(−1, N/2). For example, the right reference sample may be derived based on a weighted sum or an average of P(N, −1) and P(−1, N/2), or may be derived by interpolating a bottom right reference sample and the top right reference sample after deriving the bottom right reference sample P(N, N/2) based on P(N, −1) and P(−1, N/2). Alternatively, the bottom reference sample may be derived based on a weighted sum or an average of P(N, −1) and P (−1, N/2), or may be derived by interpolating the bottom right reference sample and the bottom left reference sample after deriving the bottom right reference sample P(N, N/2) based on P (N, −1) and P (−1, N/2).

In an example described with reference to FIGS. 14A and 14B to 16, a bottom reference sample may be derived based on at least one of a bottom left reference sample of the current block placed on the same horizontal line as the bottom reference sample or a top right reference sample of the current block placed on the same vertical line as the right reference sample, and a right reference sample may be derived based on at least one of a top right reference sample of the current block placed on the same vertical line as the right reference sample or a bottom left reference sample of the current block placed on the same horizontal line as a bottom reference sample. Unlike the example as described, the right reference sample or the left reference sample may be derived based on at least one of a top center reference sample or a left center reference sample. For example, after deriving a bottom center sample using the top center sample and the bottom left reference sample, bottom samples may be generated by interpolation or extrapolation of the bottom center sample and the bottom left sample. In addition, after deriving a right center sample by using the left center sample and the right top sample, bottom samples may be generated by interpolation or extrapolation of the right center sample and the top right sample.

A location of reference samples used to generate a first prediction image and a second prediction image may be determined differently according to a size or a shape of a current block. For example, depending on the size or the shape of the current block, a position of a top reference sample or a left reference sample used to derive a right reference sample or a bottom reference sample may be determined differently.

As an example, when the current block is a square block of N×N size, a right reference sample may be derived based on a top right reference sample P(N, −1), while a bottom reference sample may be derived based on a bottom left reference sample P(−1, N). Alternatively, when the current block is a square block of N×N size, a right reference sample and a bottom reference sample may be derived at least one of a weighted sum, an average, a minimum, or a maximum value of the top right reference sample P(N, −1) and the bottom left reference sample P(−1, N).

On the other hand, when the current block is a non-square block of N×2/N size, a bottom center reference sample P(N/2, N/2) may be derived based on a top center reference sample P(N/2, −1) and a bottom left reference sample P(−1, N/2), and then bottom reference samples may be derived based on the derived bottom center reference sample. For example, the bottom reference samples may be derived through interpolation or extrapolation of the bottom center reference sample and the bottom left reference sample. Alternatively, when the current block is a non-square block of N/2×N size, a right center reference samples P(N/2, N/2) may be derived based on a top right reference sample P(N/2, −1) and a left center reference sample P(−1, N/2), and then right reference samples may be derived based on the derived right center reference sample. For example, the right reference samples may be derived through interpolation or extrapolation of the right center reference sample and the top right reference sample.

A first prediction image may be calculated based on weighted prediction of reference samples placed on the same horizontal line as a prediction target sample. Also, a second prediction image may be calculated based on weighted prediction of reference samples placed on the same vertical line as the prediction target sample.

In addition to the above-described example, the first prediction image or the second prediction image may be generated using an average value, a minimum value, or a maximum value of reference samples.

Depending on whether a prediction target sample is included in a predetermined region of the current block, a size or a shape of the current block, or the like, a method of deriving a reference sample may be set differently, or a method of deriving a first prediction image or a second prediction may be set differently. Specifically, according to a position of a prediction target sample, the number of reference samples or a position of a reference sample used to derive a right or a bottom reference sample is determined differently, or a weight or the number of reference samples used to derive a first prediction image or a second prediction image may be set differently.

For example, a right reference sample used for generating a first prediction image of prediction target samples included in a predetermined region may be derived using only a top reference sample, and a right reference sample used for generating a first prediction image of a prediction target samples included outside the predetermined region may be derived based on a weighted sum or an average of a top reference sample and a left reference sample.

For example, as in an example shown in FIG. 15, when the current block is a non-square block whose a height is greater than a width, a right reference sample of a prediction target sample at a position (x, y) included in a predetermined region in the current block may be derived from P(N/2, −1). For example, the right reference sample of the prediction target sample included in the predetermined region may be generated by copying a value of the reference sample P(N/2, −1). On the other hand, a right reference sample of a prediction target sample at a position (x', y') included outside the predetermined region in the current block may be derived based on a weighted sum or an average value of P(N/2, −1) and P (−1, N). For example, the right reference sample of the prediction target sample included outside the predetermined region may be generated through interpolation of a bottom right reference sample P(N/2, N) derived based on P(N/2, −1) and P(−1, N) and the top right reference sample P (N/2, −1).

Alternatively, for example, as in an example shown in FIG. 16, when the current block is a non-square block whose a width is greater than a height, a bottom reference sample of a prediction target sample at a position (x, y) included in a predetermined region in the current block may be derived from P(−1, N/2). For example, the bottom reference sample of the prediction target sample included in the predetermined region may be generated by copying a value of the reference sample P(−1, N/2). On the other hand, a bottom reference sample of a he prediction target sample at a position (x', y') included outside the predetermined region in the current block may be derived based on a weighted sum or an average value of P(N, −1) and P (−1, N/2). For example, the bottom reference sample of the prediction target sample included outside the predetermined region may be generated through interpolation of a bottom right reference sample P(N, N/2) derived based on P(N, −1) and P(−1, N/2) and the bottom left reference sample P (−1, N/2).

As another example, a first prediction image or a second prediction image for prediction target samples included in a predetermined region may be generated based on a weighted sum of reference samples, and a first prediction image or a second prediction image for prediction target samples outside the predetermined region may be generated using an average value, a minimum value, or a maximum value of reference samples, or using only one having a predefined position among reference samples. For example, as in an example shown in FIG. 15, when a current block is a non-square block whose a height is greater than a width, a first prediction image for a prediction target sample at the position (x, y) included in a predetermined region in the current block may be generated using only one of right reference sample P(N/2, y) derived from P (N/2, −1) and left reference sample at a position P(−1, y). On the other hand, a first prediction image for a prediction target sample at a position (x', y') not included in the predetermined region may be generated based on a weighted sum or an average of a right reference samples P(N/2, y') derived from P(N/2, −1) and a reference sample at a position of P(−1, y').

Alternatively, as in an example shown in FIG. 16, when a current block is a non-square block whose a width is greater than a height, a second prediction image for a prediction target sample at a position (x, y) included in a predetermined region in the current block may be generated using only one of a bottom reference sample P(x, N/2) derived from P(−1, N/2) or a top reference sample at a position P(x, −1). On the other hand, a second prediction image for a prediction target sample at a position (x', y') not included in the predetermined region may be generated based on a weighted sum or an average of a bottom reference samples P (x', N/2) derived from P(−1, N/2) and a reference sample at a he position of P (−1, y').

In the above-described embodiment, a predetermined region may be at least one a sample line adjacent to a boundary of the current block or one of remaining region except for the sample line. Herein, the boundary of the current block may include at least one of a left boundary, a right boundary, a top boundary, or a bottom boundary. In addition, the number or location of boundaries used to define the predetermined region may be set differently according to a shape of the current block. Alternatively, the predetermined region may be in a shape of a block adjoins one corner of the current block. In this case, a size and a shape of the predetermined region may be determined based on at least one of a size or a shape of the current block.

In a planar mode, a final prediction image may be derived based on a weighted sum, an average, a minimum value, or a maximum value of a first prediction image and a second prediction image.

For example, Equation 11 below illustrates an example of generating the final prediction image P based on a weighted sum of the first prediction image $P_h$ and the second prediction image $P_v$.

$$P(x,y)=(w*P_h(x,y)+(1-w)*P_v(x,y)+N)>>(\log 2(N)+1) \quad \text{[Equation 11]}$$

In Equation 11, a prediction weight w may be different according to a shape, a size of the current block, or a position of a prediction target sample.

As an example, the prediction weight w may be derived in consideration of a width of the current block, a height of the current block, a width-to-height ratio, or the like. When the current block is a non-square block whose a width is greater than a height, w may be set that a higher weight is applied to the first prediction image. On the other hand, when the current block is a non-square block whose a height is greater than a width, w may be set that a higher weight is applied to the second prediction image.

As an example, when the current block is square, the prediction weight w may have a value of ½. On the other hand, when the current block is a non-square block (e.g., (N/2)×N) whose a height is greater than a width, the prediction weight w may be set to ¼. In addition, when the current block is a non-square block (e.g., N×(N/2)) whose a width is greater than a height, the prediction weight w may be set to ¾.

In addition to a planar mode, intra prediction based on a DC mode or a directional intra prediction mode also can be performed by using reference samples other than left reference samples and top reference samples. In a following embodiment, the left reference sample and the top reference sample will be referred to as a first reference sample, and reference samples other than the left reference sample and the top reference sample will be referred to as a second reference sample. As an example, the second reference sample may include a right reference sample and/or a bottom reference sample of the current block. Herein, bottom reference samples may refer to reference samples having a y-axis coordinate greater than a prediction target sample of a bottom row in the current block, and right reference samples may refer to reference samples having an x-axis coordinate greater than a prediction target sample of a rightmost column in the current block.

Whether to perform intra prediction using a second reference sample may be determined based on at least one of a size, a shape or an intra prediction mode of the current block, or a position of a prediction target sample. For example, it may be determined whether to perform intra prediction using the second reference sample based on whether the intra prediction mode of the current block is a vertical mode, a horizontal mode, or a diagonal mode. Alternatively, intra prediction for a prediction target sample included in a predetermined region in the current block is performed by using the second reference sample, while intra prediction for a prediction target sample not included in the predetermined region in the current block is performed by using a first reference sample.

Alternatively, information indicating whether the second reference sample is used may be signaled through the bitstream. The information may be a 1-bit flag, an index used to determine an intra prediction mode of the current block, or the like.

Alternatively, whether to use the second reference sample may be determined based on whether the second reference sample is used in a neighboring block of the current block.

A second reference sample may be generated based on a first reference sample. As an example, second reference samples may be configured by changing an order of first reference samples, or a second reference samples may be derived using a first reference sample at a specific position.

Figure 17:
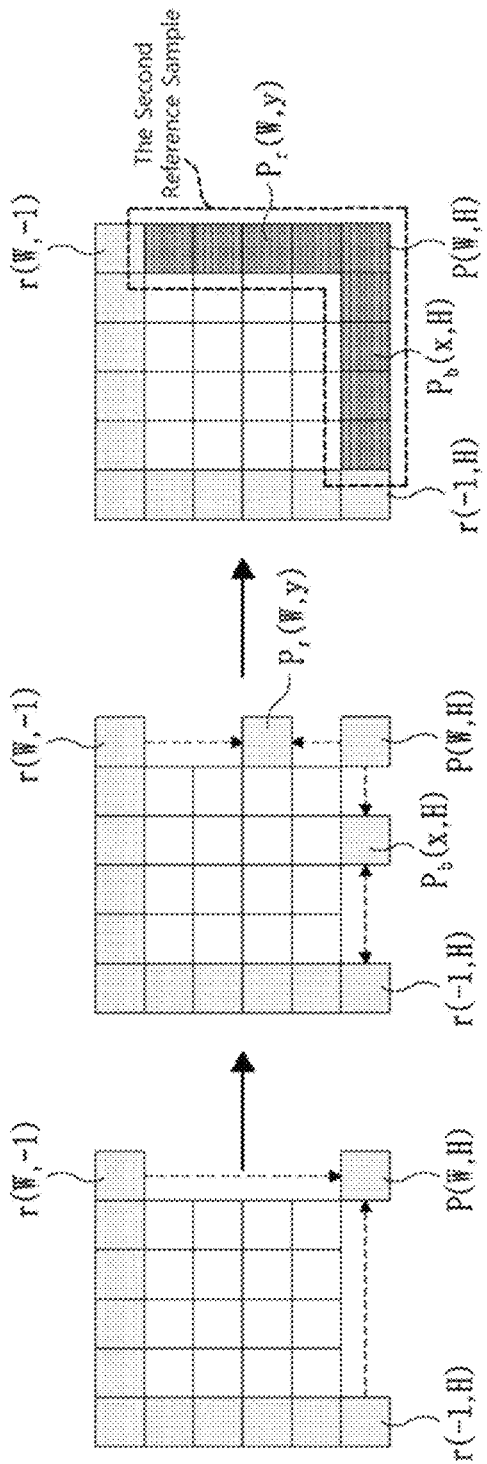
FIG. 17 is a diagram for explaining an example of deriving a second reference sample using a first reference sample.

FIG. 17 is a diagram for explaining an example of deriving a second reference sample using a first reference sample.

First, a bottom right reference sample P(W, H) derived based on a top right reference sample r(W, −1) and a bottom left reference sample r(−1, H) of the current block may be derived. In detail, the bottom right reference sample may be derived through a weighted sum or an average value of the top right reference sample and the bottom left reference sample. Equation 12 shows an example of deriving the bottom right reference sample.

$$P(W, H) = \frac{W \times r(W, -1) + H \times r(-1, H)}{W + H} \quad \text{[Equation 12]}$$

As shown in Equation 12, the bottom right reference sample may be calculated based on a weighted sum between the top right reference sample and the bottom left reference sample. In this case, a weight applied to the top right reference sample and the bottom left reference sample may be determined according to a width and a height of the current block. For example, when the current block is square, the same weight is applied to the top right reference sample and the bottom left reference sample. In contrast, when the current block is non-square, different weights may be applied to the top right reference sample and the bottom left reference sample. However, the weight setting method shown in Equation 12 is merely an example of the present invention, and the present invention is not limited thereto. In addition to an example shown in Equation 12, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

A right reference sample may be derived based on the top right reference sample and the bottom right reference sample. For example, the right reference sample may be obtained by interpolating the top right reference sample and the bottom right reference sample. Equation 13 below shows an example of deriving the right reference sample.

$$P_r(W, y) = \frac{(H-1-y) \times r(W, -1) + (y+1) \times P(W, H)}{H}$$ [Equation 13]

As shown in Equation 13, the right reference sample $P_r(W, y)$ (where y is an integer between 0 and CU height (cu_height)), may be obtained by weighted prediction of the top right reference sample r(W, −1) and the bottom right reference sample P(W, H). In this case, a weight applied to the top right reference sample and the bottom right reference sample may be determined based on at least one of a width, a height of the current block, or a position of the right reference sample. For example, as in an example shown in Equation 13, a weight of (H−1−y)/H is applied to the top right reference sample, while a weight of (y+1)/H is applied to the bottom right reference sample. However, a weight setting method shown in Equation 13 is merely an example of the present invention, and the present invention is not limited thereto. In addition to an example shown in Equation 13, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

A bottom reference sample may be derived based on the bottom left reference sample and the bottom right reference sample. As an example, the bottom reference sample may be obtained by interpolating the bottom left reference sample and the bottom right reference sample. Equation 14 shows an example of deriving the bottom reference sample.

$$P_b(x, H) = \frac{(W-1-x) \times r(-1, H) + (x+1) \times P(W, H)}{W}$$ [Equation 14]

As shown in Equation 14, the bottom reference sample $P_b(x, H)$ (where x is an integer between 0 and CU width (cu_width)), may be obtained by weighted prediction of the bottom left reference sample r(−1, H) and the bottom right reference sample P(W, H). In this case, a weight applied to the bottom left reference sample and the bottom right reference sample may be determined based on at least one of a width, a height of the current block, or a position of the bottom reference sample. For example, as in an example shown in Equation 14, a weight of (W−1−x)/W is applied to the bottom left reference sample, while a weight of (x+1)/H is applied to the bottom right reference sample. However, the weight setting method shown in Equation 14 is only an example of the present invention, and the present invention is not limited thereto. In addition to an example shown in equation 14, the weight may be determined based on at least one of a size, a shape or an intra prediction mode of the current block, availability of a reference sample, availability of a neighboring block, whether a neighboring block is encoded in an intra prediction mode, or an intra prediction mode of a neighboring block.

When the current block is non-square, a right reference sample and a bottom reference sample may be derived based on an example described above with reference to FIGS. 15 and 16.

As in the above-described example, a second reference sample such as a right reference sample and a bottom reference sample may be derived using a first reference samples of a fixed position such as a top right reference sample and a bottom left reference sample. Unlike the example described above, a second reference sample may be derived using a first reference sample at a position different from a top right reference sample and/or a top left reference sample. For example, a right reference sample and a bottom reference sample may be derived by using a first reference sample such as a top center reference sample of the current block or a left center sample of the current block.

Alternatively, a first reference sample used to derive a second reference sample may be determined according to an intra prediction mode of the current block. As an example, a right reference sample and/or a bottom reference sample may be derived based on a he left reference sample and/or a top reference sample specified by a directionality of the intra prediction mode of the current block.

Alternatively, a second reference sample may be determined using a plurality of left reference samples and/or a plurality of top reference samples. For example, at least one of a right reference sample, a bottom reference sample, or a right bottom reference sample may be generated based on a weighted sum, an average value, a maximum value, or a minimum value of a plurality of left reference samples, or a weighted sum, an average value, a maximum value or a minimum value of a plurality of top reference samples.

Alternatively, a second reference sample may be generated by copying a first reference sample. In this case, the first reference sample used to generate the second reference sample may have a fixed position or may be adaptively determined according to a size, a shape or an intra prediction mode or the current block, or position of the second reference sample.

In an above example, although illustrated as having W bottom reference samples and H right reference samples, a larger number of bottom reference samples and/or right reference samples may be derived. For example, bottom reference samples may be derived up to the same vertical line as the rightmost top reference sample r(2W−1, −1), or right reference samples may be derived up to the same horizontal line as the lowest left reference sample r(−1, 2H−1).

In this case, a bottom reference sample having an x coordinate greater than W may be generated by extrapolating a bottom left reference sample and a bottom right reference sample, or may be generated by interpolating the bottom right reference sample P (W, H) and a rightmost bottom reference sample P(2W−1, H). The rightmost bottom reference sample may be generated by copying a rightmost top reference sample r(2W−1, −1), or may be generated through a weighted sum operation between the rightmost top reference sample and the bottom left reference sample. A right reference sample having a y coordinate greater than H may be generated by extrapolating the top right reference sample and the bottom right reference sample, or may be generated by interpolation the bottom right reference samples P(W, H) and a lowest right reference samples P (W, 2H−1). In this case, the lowest right reference sample may be generated by copying a lowest left reference sample r (−1, 2H−1) or may be generated by a weighted sum operation between the lowest left reference sample and the top left reference sample.

A first reference samples may be arranged in one dimension to generate a first one-dimensional reference sample group, and a second reference samples may be arranged in one dimension to generate a second one-dimensional reference sample group. In this case, the first one-dimensional reference sample group may be configured to include not only the first reference samples but also at least one or more of the second reference samples, and the second one-dimensional reference sample group may be configured to include not only the second reference samples but also at least one or more of the first reference samples.

Figure 18A:
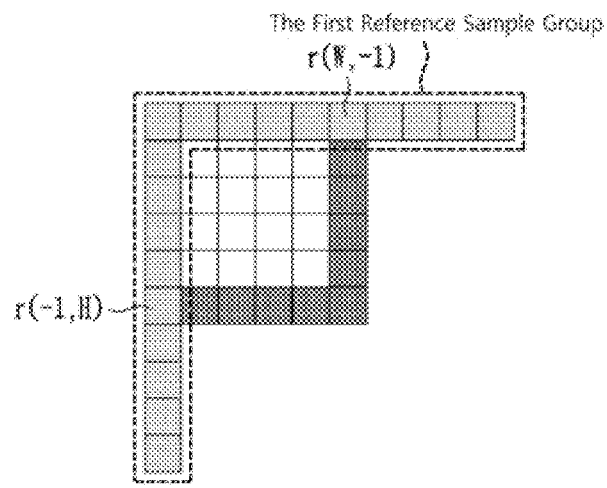
FIGS. 18A and 18B are diagrams illustrating reference samples that constitute a one-dimensional reference sample group.
Figure 18B:
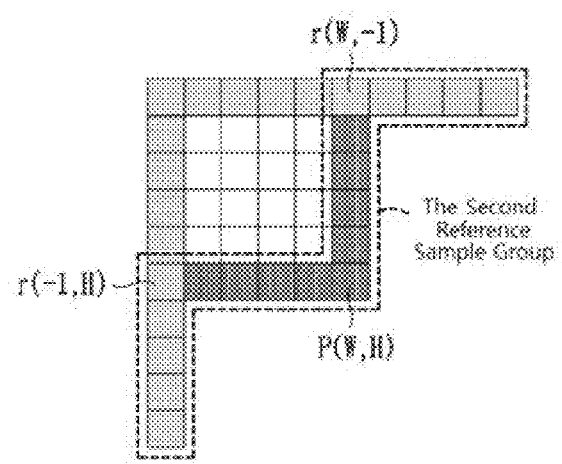

FIGS. 18A and 18B are diagrams illustrating reference samples that constitute a one-dimensional reference sample group.

As in an example shown in FIG. 18A, the first one-dimensional reference sample group may be composed of left reference samples and top reference samples of a current block.

On the other hand, as in an example shown in FIG. 18B, the second one-dimensional reference sample group may be configured to further include not only the right reference samples and the bottom reference samples of the current block, but also some left reference samples and some top reference samples.

That is, a bottom left reference sample r(−1, H) and left reference samples having a y-axis coordinate greater than the bottom left reference sample among left reference samples may be included in both the first one-dimensional reference sample group and the second one-dimensional reference sample group. Also, a top reference samples r(W, −1) and top reference samples having an x-axis coordinate greater than the top right reference sample among top reference samples may be included in both the first one-dimensional reference sample group and the second one-dimensional reference sample group.

Alternatively, based on at least one of a size, a shape, or an intra prediction mode of the current block, a part of first reference samples may be included only in the first one-dimensional reference sample group, or a part of first reference samples may be included only in the second one-dimensional reference sample group. In addition to a configuration of a one-dimensional reference sample group, an arrangement order of reference samples constituting the one-dimensional reference sample group also can be variably determined based on at least one of a size, a shape, or an intra prediction mode of the current block.

For convenience of description, in the embodiment described below, a reference sample group including left reference samples and top reference samples of the current block will be referred to as a first reference sample group (e.g., a first one-dimensional reference sample group), a reference sample group including right reference samples and bottom reference samples of the current block will be referred to as a second reference sample group (e.g., a second one-dimensional reference sample group). For example, the first reference sample group and the second reference sample group may be classified according to whether right reference samples and bottom reference samples are included. In addition, in order to perform intra prediction of a prediction target sample, a reference sample selected from the first reference sample group will be referred to as a first basic reference sample, and a reference sample selected from the second reference sample group will be referred to as a second basic reference sample.

Intra prediction of the current block may be performed using at least one of a first reference sample group or a second reference sample group. For example, a prediction value of a prediction target sample in the current block may be obtained based on at least one of a first basic reference sample selected from the first reference sample group or a second basic reference sample selected from the second reference sample group. In this case, the first basic reference sample and/or the second basic reference sample may be determined based on at least one of a shape, a size, or an intra prediction mode of the current block. For example, when the intra prediction mode of the current block is determined, the first basic reference sample for the prediction target sample may be specified according to a direction of the determined intra prediction mode, and the second basic reference samples for the prediction target sample may be specified according to a reverse direction of the determined intra prediction mode Alternatively, a position of the second basic reference sample may be determined based on a position of the first basic reference sample, or a position of the first basic reference sample may be determined based on a position of the second basic reference sample. For example, the second basic reference sample having the same x coordinate or the same y coordinate as the first basic reference sample may be selected, or the second basic reference sample having a position derived by adding an offset to the x coordinate or the y coordinate of the first basic reference sample may be selected. Herein, the offset may have a fixed value or may be adaptively determined according to a size, a shape, or an intra prediction mode of the current block.

Alternatively, a position of the first basic reference sample and/or the second basic reference sample may be determined based on a position of a prediction target sample. For example, the first basic reference sample and/or the second basic reference sample having the same x coordinate or the same y coordinate as the prediction target sample may be selected, or the first basic reference sample and/or the second basic reference sample having a position obtained by adding an offset to the x coordinate or the y coordinate of the prediction target sample may be selected. Herein, the offset may have a fixed value or may be adaptively determined according to a size, a shape, or an intra prediction mode of the current block.

A prediction value of a prediction target sample may be generated based on at least one of a first prediction image based on the first basic reference sample or a second prediction image based on the second basic reference sample. In this case, the first prediction image may be generated based on the above description through Equation 8 to Equation 10 described above.

The second prediction image may be generated by interpolating or copying the second basic reference sample specified according to a slope of an intra prediction mode of the current block. For example, Equation 15 is a diagram illustrating an example of deriving the second prediction image by copying the second basic reference sample.

$$P_2(x,y) = P\_2nd\_1D(x+iIdx+1+f)  \quad \text{[Equation 15]}$$

In Equation 15, $P_2(x, y)$ represents the second prediction image, and $P\_2nd\_1D(x+iIdx+1+f)$ represents the second basic reference sample.

When only one second basic reference sample cannot express a slope of an intra prediction mode of the current block, the second prediction image may be generated by interpolating a plurality of second basic reference samples. Specifically, when an imaginary angular line following a slope and/or angle of an intra prediction mode does not pass an integer pel (i.e., a reference sample of an integer position), the second prediction image may be obtained by interpolating second reference samples adjacent to a left and a right or an up and a down of the angular line. For example, Equation 16 illustrates an example of obtaining the second prediction image by interpolating the second reference samples.

$$P_2(x, y) = \frac{(32 - i_{fact})}{32} \times \text{P\_2nd\_1D}(x + ildx + 1 + f) +$$
$$\frac{i_{fact}}{32} \times \text{P\_2nd\_1D}(x + ildx + 2 + f)$$
[Equation 16]

A coefficient of an interpolation filter may be determined based on a weight related parameter $i_{fact}$. As an example, the coefficient of the interpolation filter may be determined based on a distance between a fractional pel and an integer pel (i.e., an integer position of each reference sample) located on an angular line.

In Equation 16, it is illustrated that a interpolation filter having a tap number of 2 is used, but an interpolation filter having a tap number greater than 2 can be used instead.

A final prediction image of a prediction target sample may be obtained based on at least one of a first prediction image or a second prediction image. For example, the first prediction image may be determined as the final prediction image of a prediction target sample, or the second prediction image may be determined as the final prediction image of the prediction target sample. Alternatively, the final prediction image of the prediction target sample may be determined based on a weighted sum or an average of the first prediction image and the second prediction image. Equation 17 shows an example of obtaining the final prediction sample based on a weighting operation of the first prediction image and the second prediction image.

$$P(x,y) = w(x,y) \times P_1(x,y) + (1 - w(x,y)) \times P_2(x,y)$$ [Equation 17]

In Equation 17, $P_1(x, y)$ represents a first prediction image, and $P_2(x, y)$ represents a second prediction image. In addition, w(x, y) represents a weight applied to the first prediction image.

Weights assigned to the first prediction image and the second prediction image may be determined based on at least one of a location of a prediction target sample, or a size, a shape, or an intra prediction mode of the current block. For example, Equation 18 shows an example in which the weights are determined according to a size of the current block and a position of the prediction target sample.

$$P(x, y) = \frac{((W + H) - (x + y)) \times P_1(x, y) + (x, y) \times P_2(x, y)}{W + H}$$ [Equation 18]

In Equation 18, W and H represent a width and a height of the current block, respectively, and (x, y) represents a coordinate of a prediction target sample.

As in an example shown in Equation 18, as a prediction target sample is closer to a top left corner of the current block, a weight to be applied to a first predicted image may be increased. In addition, as a prediction target sample is closer to a bottom right corner of the current block, a weight applied to a second prediction image may be increased.

Alternatively, a weight may be derived from a neighboring block of the current block. Herein, the neighboring block of the current block may include at least one of a top neighboring block, a left neighboring block, or a neighboring block adjacent to a corner of the current block (e.g., a top left neighboring block, a top right neighboring block, or a bottom left neighboring block).

Alternatively, information for determining a weight may be signaled via a bitstream. The information may indicate a weight value applied to a first prediction image or a second prediction image, or may indicate a weight difference value between the current block and a neighboring block.

As in the above-described example, obtaining a final prediction image through a weighted sum operation between a first prediction image and a second prediction image may be referred to as bi-directional intra prediction (or bi-intra prediction).

Bi-intra prediction may be applied only for a part of regions in the current block. In this case, a region to which the bi-intra prediction is applied may be pre-defined in the encoder and the decoder. For example, the bi-intra prediction may be applied to a predetermined sized (e.g., 4×4) block adjacent to a bottom right corner of the current block. Alternatively, a region to which the bi-intra prediction is applied may be determined adaptively according to a size, a shape, or an intra prediction mode of the current block. Alternatively, information for determining a region to which the bi-intra prediction is applied (e.g., information indicating a size or a location of the area) may be signaled through the bitstream.

Figure 19:
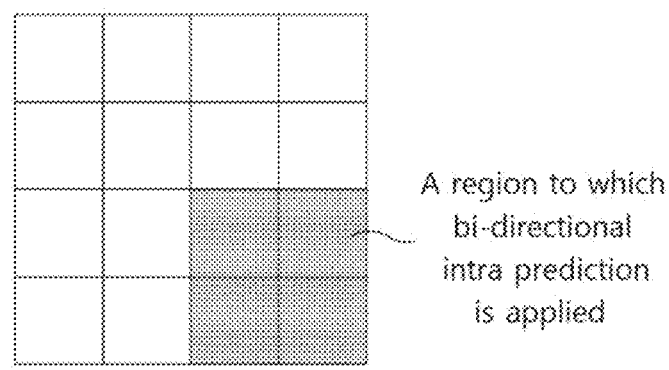
FIG. 19 is an example of a region to which bi-directional intra prediction is applied.

FIG. 19 is an example of a region to which bi-directional intra prediction is applied.

In a region to which bi-directional intra prediction is applied, a final prediction sample may be obtained by weighted prediction of a first prediction image and a second prediction image. On the other hand, a first prediction image or a second prediction image may be determined as a final prediction sample in a region where bi-directional intra prediction is not applied.

In the above example, it has been described that bi-directional intra prediction is performed using a first basic reference sample selected from a first sample group and a second basic reference sample selected from a second sample group. Unlike the example as described, it is also possible to select a plurality of reference samples from a first sample group to perform bi-directional intra prediction, or to select a plurality of reference samples from a second sample group to perform bi-directional intra prediction. For example, when an intra prediction mode of the current block has a top right diagonal direction or a bottom left diagonal direction, bi-directional intra prediction may be performed by selecting a top reference sample and a left reference sample from a first sample group. That is, a final prediction sample of the current block may be obtained by weighted prediction of a first reference image obtained based on the top reference sample and a second reference image obtained based on the bottom reference sample.

Alternatively, according to an intra prediction mode, bi-directional intra prediction may be performed by selecting a right reference sample and a bottom reference sample from a second sample group.

Bi-directional intra prediction may be defined as an independent intra prediction mode. For example, a total of 2N+2 intra prediction modes may be defined by defining N directional prediction modes and N bi-directional intra prediction modes corresponding to the N directional prediction modes. For example, by adding a bi-directional intra prediction mode to an intra prediction mode illustrated in FIG. 8, a total of 68 intra prediction modes (that is, two non-directional intra prediction modes, 33 directional intra prediction modes, and 33 bi-directional intra prediction modes) may be defined. Of course, it is also possible to use more or less than 33 directional intra prediction modes or to use more or less than 33 bi-directional intra prediction modes.

Alternatively, after determining an intra prediction mode of the current block, it may be determined whether to use the determined intra prediction mode to switch to a bi-directional prediction mode. For example, when an intra prediction mode of the current block is determined, information about whether to use the determined intra prediction mode as a bi-directional intra prediction mode may be decoded. The information may be a 1-bit flag (e.g., bi_intra_flag), but is not limited thereto. A value of bi_intra_flag of 0 indicates that directional intra prediction is performed, and a value of bi_intra_flag of 1 indicates that bi-directional intra prediction is performed. That is, when the value of bi_intra_flag is 0, a first prediction image is determined as a final prediction sample of the current block, whereas when the value of bi_intra_flag is 1, weighted prediction of a first prediction image and a second prediction image may be determined as a final prediction sample of the current block.

Alternatively, depending on whether a neighboring block adjacent to the current block used a bi-directional intra prediction mode, it may be determined whether the current block uses a bi-directional intra prediction mode. For example, when an intra prediction mode of the current block is the same as a candidate (i.e., MPM candidate) derived based on an intra prediction mode of the neighboring block, whether to use a bi-directional intra prediction mode for the current block may be determined in the same as whether a bi-directional intra prediction mode was used in the neighboring block.

Alternatively, whether to perform bi-directional intra prediction may be determined based on a size and/or a shape of the current block. For example, bi-directional intra prediction is allowed for only a block of 32×32 or more. Accordingly, bi-directional intra prediction may not be applied when a size of the current block is smaller than 32×32, whereas bi-directional intra prediction may be applied when a size of the current block is 32×32.

As another example, bi-directional intra prediction may be allowed only for a square block, or bi-directional intra prediction may be allowed only for a non-square block.

Figure 20:
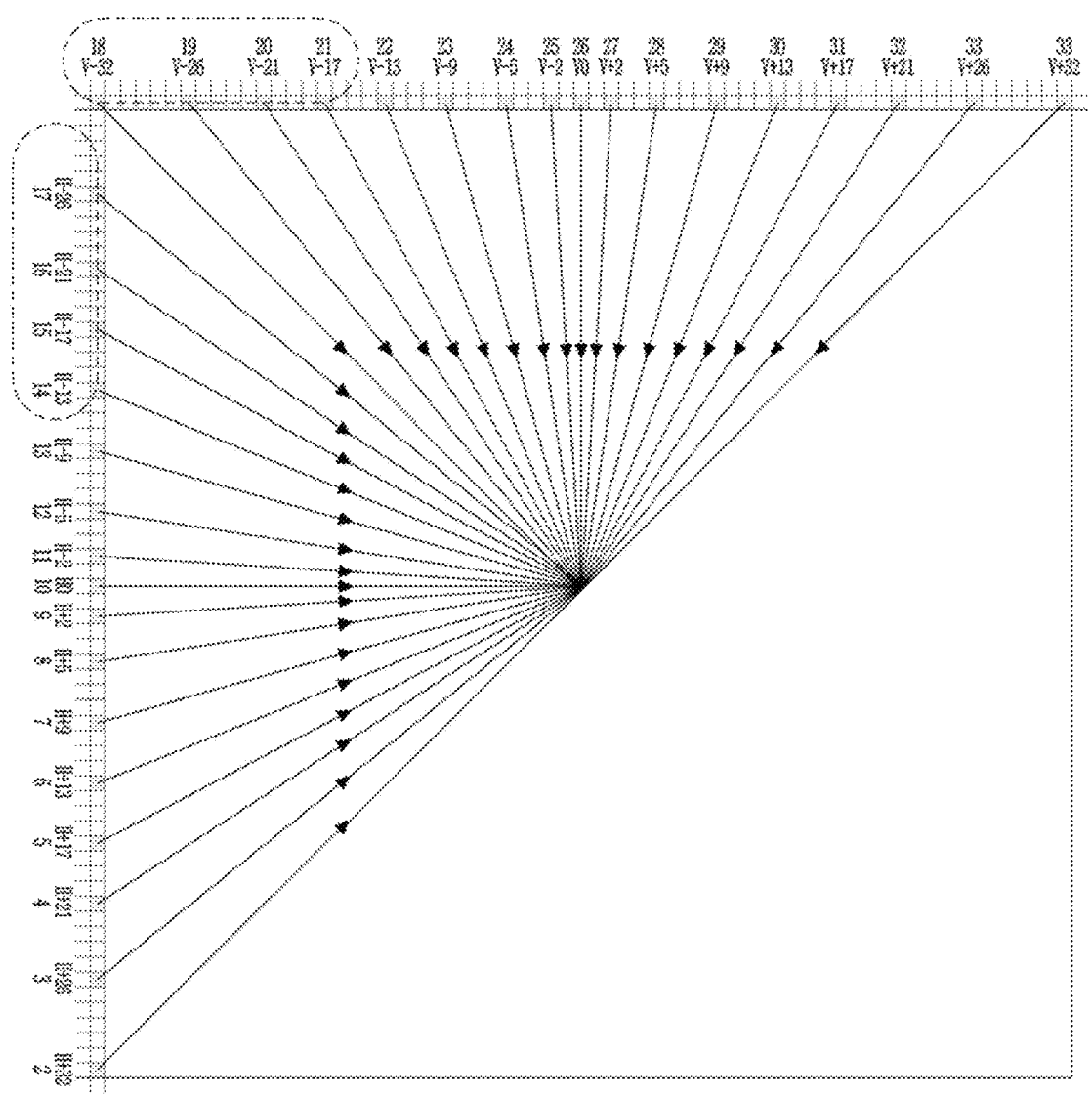
FIG. 20 is an example of identifying and indicating a directional prediction mode in which bi-directional intra prediction is allowed.

Alternatively, bi-directional intra prediction may be applied only for a part of directional intra prediction modes. For example, FIG. 20 is an example of identifying and indicating a directional prediction mode in which bi-directional intra prediction is allowed. As shown in the example illustrated in FIG. 20, bi-directional intra prediction is allowed only for a part of intra prediction modes between a horizontal direction and a vertical direction. In this case, bi-directional intra prediction may be performed by default when an intra prediction mode is selected within the range, or it may be determined whether to perform bi-directional intra prediction mode based on at least one of information parsed through the bitstream, or a size or a shape of the current block when an intra prediction mode within the range is selected.

An intra prediction mode in which bi-directional intra prediction is allowed is not limited to the example shown in FIG. 20. An intra prediction mode in which bi-directional intra prediction is allowed may be predefined in the encoder and the decoder, or may be adaptively determined according to a size and/or a shape of the current block. Alternatively, information for determining an intra prediction mode in which bi-directional intra prediction is allowed may be signaled through a bitstream.

Figure 21:
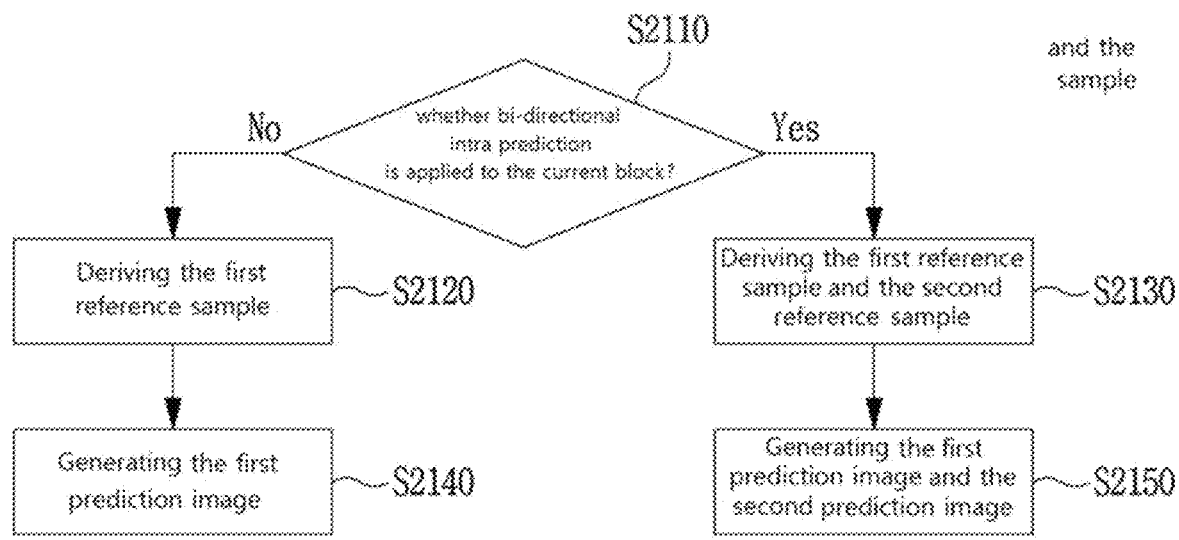
FIG. 21 is a flowchart illustrating an intra prediction method of a current block based on a bi-directional intra prediction mode according to the present invention.

FIG. 21 is a flowchart illustrating an intra prediction method of the current block based on a bi-directional intra prediction mode according to the present invention.

First, it may be determined whether bi-directional intra prediction is applied to the current block (S2110). Whether bi-directional intra prediction is applied to the current block may be determined based on information parsed from the bitstream, a shape, a size, or an intra prediction mode of the current block.

As an example, after determining an intra prediction mode of the current block based on a candidate list and an index, whether bi-directional intra prediction on the current block is applied may be determined based on a size or a shape of the current block, or information parsed from a bitstream (e.g., bi_pred_flag). Alternatively, whether bi-directional intra prediction is applied to the current block may be determined based on whether the intra prediction mode of the current block is a directional prediction mode to which bi-directional intra prediction is applied.

Thereafter, a reference sample of the current block may be derived (S2120). First, first reference samples adjacent to a left and a top of the current block may be derived, and second reference samples adjacent to a right and a bottom of the current block may be further derived when bi-directional intra prediction is applied to the current block (S2130).

In addition, when bi-directional intra prediction is not applied to the current block, according to the intra prediction mode of the current block, a first prediction image may be generated based on at least one basic reference sample among the first reference samples (S2140). In this case, the first prediction image may be determined as a final prediction sample of the current block.

On the other hand, when bi-directional intra prediction is applied to the current block, in addition to the first prediction image, a second prediction image may be generated based on at least one basic reference sample of the second reference samples (S2150). The first basic reference sample and the second basic reference sample may be determined based on a directionality of the intra prediction mode, and may be determined based on a size or a shape of the current block, or a position of another basic reference sample. When the first prediction image and the second prediction image are obtained, a final prediction sample of the current block may be obtained by weighted prediction of the first prediction image and the second prediction image.

When an intra prediction mode of the current block is a DC mode, a DC value may be derived from reference samples, and the derived DC value may be determined as a value of prediction samples in the current block. For example, when an intra prediction mode of the current block is a DC mode, an average value of top reference samples and left reference samples of the current block may be determined as a DC value, and the DC value may be determined as a value of a prediction sample in the current block. In this case, top left reference sample r(−1, −1) may be excluded when calculating the DC value.

If the current block is big enough or if the current block is not square, there may be a problem in that a prediction efficiency is lowered since a correlation between the current block and some reference samples is low. Accordingly, a DC value may be calculated by differently setting a range of reference samples used for calculating the DC value according to a size or a shape of the current block or by applying different weights to reference samples according to a position of thereof.

For example, a weight applied to top reference samples having the same x coordinate as a rightmost column of the current block or having an x coordinate smaller than the rightmost column of the current block may have a higher value than a weight applied to top reference samples having an x coordinate greater than the rightmost column of the current block, or a weight applied to left reference samples having the same y coordinate as a bottom row of the current block or having y coordinate smaller than the bottom row of the current block may have a higher value than a weight applied to left reference samples having a y coordinate greater than the bottom row of the current block.

Figure 22:
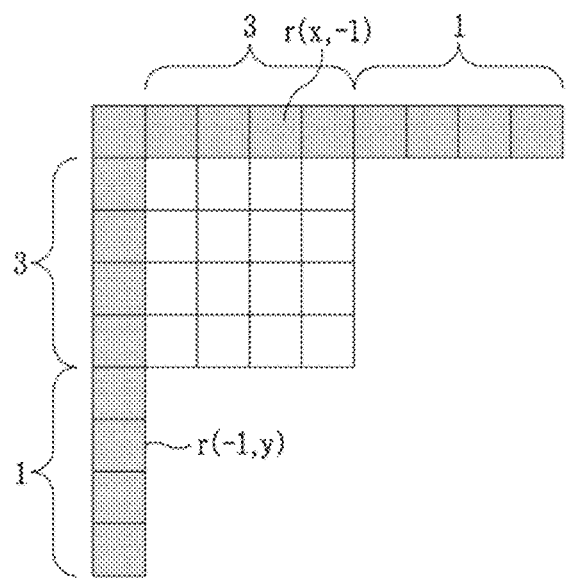
FIG. 22 is a diagram illustrating an example in which different weights are applied according to a position of a reference sample.

FIG. 22 is a diagram illustrating an example in which different weights are applied according to a position of a reference sample.

It is illustrated in FIG. 22 that a weight of 1 is applied to top reference samples having an x coordinate greater than a rightmost column of the current block and left reference samples having a y coordinate greater than a bottom row of the current block, and a weight of 3 is applied to the other top reference samples and the other left reference samples. According to the example shown in FIG. 22, a DC value may be calculated based on Equation 19 below.

$$DC\_val = \frac{3 \times \sum_{x=0}^{W-1} r(x, -1) + \sum_{x=W}^{2W-1} r(x, -1) + 3 \times \sum_{y=0}^{H-1} r(-1, y) + \sum_{x=H}^{2H-1} r(-1, y)}{4 \times (W + H)}$$ [Equation 19]

In the example shown in FIG. 22, it is illustrated that a value of a weight is changed based on an x coordinate of a rightmost column of the current block and a y coordinate of a bottom row of the current block, however, it is also possible to change a value of a weight based on a different position from illustrated therein.

It is also possible to determine a weight for each reference sample based on a size and/or a shape of the current block. For example, when the current block is a non-square block whose a width greater than a height, a weight applied to at least a part of top reference samples may be set to have a value greater than a weight applied to at least a part of left reference samples. On the other hand, when the current block is a non-square block having a height greater than a width, a weight applied to at least a part of left reference samples may be set to have a value greater than a weight applied to at least a part of top reference samples.

Figure 23:
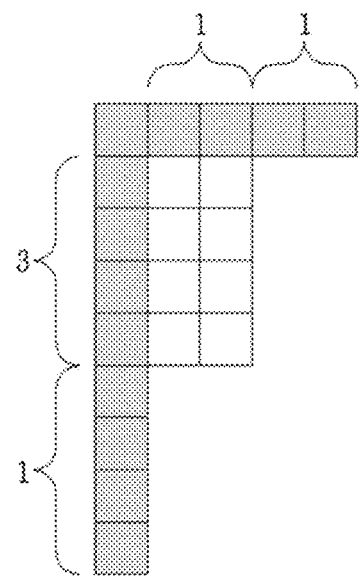
FIGS. 23 and 24 show weights applied to reference samples when the current block is non-square.
Figure 24:
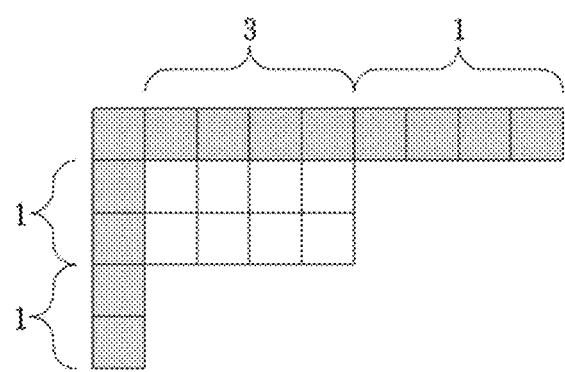

FIGS. 23 and 24 show weights applied to reference samples when the current block is non-square.

In FIG. 23, it is illustrated that a weight of 1 is applied to top reference samples and left reference samples whose a y coordinate is greater than a bottom row of the current block, while a weight of 3 is applied to left reference samples whose a y coordinate is equal to or smaller than the bottom row of the current block. That is, as in the example shown in FIG. 23, when the current block has a non-square shape whose a height is greater than a width, a weight applied to left reference samples of the current block may be set to have a value greater than a weight applied to top reference samples. Accordingly, a DC value may be obtained as shown in Equation 20 below.

$$DC\_val = \frac{3 \times \sum_{x=0}^{W-1} r(x, -1) + \sum_{x=W}^{2W-1} r(x, -1) + \sum_{y=0}^{2H-1} r(-1, y)}{4H + 2W}$$ [Equation 20]

In FIG. 24, it is illustrated that a weight of 1 is applied to left reference samples and top reference samples whose an x coordinate is greater than a rightmost column of the current block, while a weight of 3 is applied to top reference samples whose an x coordinate is equal to or smaller than the rightmost column of the current block. That is, as in the example shown in FIG. 24, when the current block has a non-square shape whose a width is greater than a height, a weight applied to top reference samples of the current block may be set to have a value greater than a weight applied to left reference samples. Accordingly, a DC value may be obtained as shown in Equation 21 below.

$$DC\_val = \frac{\sum_{x=0}^{2W-1} r(x, -1) + 3 \times \sum_{y=0}^{H-1} r(-1, y) + \sum_{x=H}^{2H-1} r(-1, y)}{4W + 2H}$$ [Equation 21]

In FIG. 23, it is illustrated that a weight of 1 is applied to all of top reference samples whose an x coordinate is greater than a rightmost column of the current block and top reference samples whose an x coordinate is equal to or smaller than the rightmost column of the current block. However, it is also possible to set weights applied to each of them differently from illustrated therein. Similarly, in FIG. 24, it is also possible to set weights applied to each of left reference samples whose a y coordinate is greater than a bottom row of the current block and left reference samples whose a y coordinate is equal to or smaller than the bottom row of the current block differently.

A weight applied to reference samples may have a value fixed in the encoder and the decoder. Alternatively, a weight may be adaptively determined based on a shape or a size of the current block. For example, a weight may be adaptively determined according to a height, a width, or an aspect ratio of the current block.

Alternatively, information indicating a weight applied to each reference sample may be signaled through the bitstream. A weight applied to each reference sample may be determined based on the information.

Alternatively, a weight applied to the current block may be determined based on a weight applied to a neighboring block adjacent to the current block. For example, a weight applied to a neighboring block may be determined as a weight of the current block, or the weight of the current block may be derived by adding a difference value to the weight applied to the neighboring block. Here, the difference value may be determined based on information signaled through the bitstream.

In FIGS. 22 to 24, it is illustrated that at least one of left reference samples or top reference samples is split into two groups to which different weights are applied. Unlike in the example as illustrated, left reference samples or top reference samples may be split into greater number of groups than the example, and then different weights may be applied to each group. For example, a DC value may be calculated by assigning a different weight to each reference sample or by assigning a different weight to each group unit. In this case, a group unit may be generated by splitting in a unit of a predefined number. That is, each group unit may include the same number of reference samples. Alternatively, the number of reference samples included in each group unit may be differently determined based on a size or a shape of the current block.

As another example, a weight applied to each of left reference samples and/or top reference samples may be uniform, however, weights applied to left reference samples and top reference samples may be determined to be different from each other. For example, if the current block has a non-square shape whose a width is greater than a height, a DC value may be obtained by applying a higher weight to top reference samples than left reference samples. On the other hands, if the current block has a non-square shape whose a height is greater than a width, a DC value may be obtained by applying a higher weight to left reference samples than top reference samples.

Depending on a size or a shape of the current block, only a part of top reference samples or left reference samples may be used to calculate a DC value. For example, when the current block has a non-square shape whose a width is greater than a height, the DC value may be calculated using only top reference samples. That is, when the current block has a non-square shape whose a width is greater than a height, an average value of top reference samples may be determined as a DC value, or a weighted sum between top reference samples may be determined as the DC value. Alternatively, when the current block has a non-square shape whose a height is greater than a width, a DC value may be calculated using only left reference samples. That is, when the current block has a non-square shape whose a height is greater than a width, an average value of left reference samples may be determined as a DC value, or a weighted sum between left reference samples may be determined as the DC value.

Or, depending on a shape of the current block, a DC value may be calculated by excluding at least one of top reference samples whose an x coordinate is greater than a rightmost row of the current block or left reference samples whose a y coordinate is greater than a bottom row of the current block.

As in the above-described example, generating a DC value by applying different weights to top reference samples and left reference samples may be referred to as 'DC weighted prediction'.

Whether to apply DC weighted prediction to the current block may be determined based on a size or a shape of the current block. As an example, DC weighted prediction may be allowed only for a block whose a size is equal to or greater than a predetermined threshold. Here, the threshold may indicate a block size such as 16×16, 32×32, or 64×64, or may indicate a reference value for any one of a width or a height of a block. When a size of the current block is smaller than the threshold, even if an intra prediction mode of the current block is a DC mode, DC weighted prediction may not be applied. When DC weighted prediction is not applied, a DC value may be determined by applying the same weight to top reference samples and left reference samples. Alternatively, DC weighted prediction may be allowed only when the current block is non-square.

As another example, information indicating whether to apply DC weighted prediction may be signaled through the bitstream.

Alternatively, whether to apply DC weighted prediction to the current block may be determined according to whether DC weighted prediction is used in a neighboring block adjacent to the current block. For example, if an intra prediction mode of the current block is the same as a candidate (i.e., MPM candidate) derived from an intra prediction mode of the neighboring block, whether to apply DC weighted prediction to the current block may be determined to be the same as whether DC weighted prediction was applied to the neighboring block.

Alternatively, DC weighted prediction may be applied by default when an intra prediction mode of the current block is a DC mode.

Although the above-described embodiments have been described on the basis of a series of steps or flowcharts, they do not limit the time-series order of the invention, and may be performed simultaneously or in different orders as necessary. Further, each of the components (for example, units, modules, etc.) constituting the block diagram in the above-described embodiments may be implemented by a hardware device or software, and a plurality of components. Or a plurality of components may be combined and implemented by a single hardware device or software. The above-described embodiments may be implemented in the form of program instructions that may be executed through various computer components and recorded in a computer-readable recording medium. The computer-readable recording medium may include one of or combination of program commands, data files, data structures, and the like. Examples of computer-readable media include magnetic media such as hard disks, floppy disks and magnetic tape, optical recording media such as CD-ROMs and DVDs, magneto-optical media such as floptical disks, media, and hardware devices specifically configured to store and execute program instructions such as ROM, RAM, flash memory, and the like. The hardware device may be configured to operate as one or more software modules for performing the process according to the present invention, and vice versa.

INDUSTRIAL APPLICABILITY

The present invention may be applied to electronic devices which is able to encode/decode a video.

The invention claimed is:

1. A method of decoding a video, the method comprising:
determining an intra prediction mode of a current block;
when it is determined that the intra prediction mode of the current block is a directional intra prediction mode, obtaining a first prediction value for a current sample in the current block based on a first reference sample located on a forward direction of the directional intra prediction mode from the current sample; and
generating a final prediction value of the current sample in the current block by modifying the first prediction value based on a second reference sample,
wherein the intra prediction mode of the current block is determined as one of either conventional intra-prediction modes or extended intra prediction modes,
wherein whether the intra prediction mode of the current block is determined as one of the conventional intra prediction modes or the extended intra prediction modes is determined based on a shape of the current block,
wherein the second reference sample is located on an opposite direction of the directional intra prediction mode from the current sample,
wherein the final prediction value is generated based on a weighted sum of the first prediction value and the second reference sample,
wherein modifying the first prediction value is performed in response that a size of the current block is greater than a threshold value.

2. The method of claim 1, wherein modifying the first prediction value is allowed only when the directional prediction mode is one of intra prediction modes pre-defined in a decoder.

3. The method of claim 2, wherein prediction values of samples belonging to a first region in the current block are modified but prediction values of samples belonging to a second region in the current block are output as they are.

4. The method of claim 3, wherein a size of the first region and the second region is determined differently based on the intra prediction mode of the current block.

5. The method of claim 4, wherein a position of the second reference sample is determined based on a value resulting from adding a x-coordinate or a y-coordinate of the current sample to an offset value, and
   wherein the offset value is determined based on an angle of the directional intra prediction mode of the current block.

6. The method of claim 5, wherein the first prediction value for the current sample is obtained based on a weight sum of a plurality of first reference samples while the second prediction value is obtained by copying a value of the second reference sample.

7. The method of claim 1, wherein when the shape of the current block is a non-square, the intra prediction mode of the current block is determined as one of the extended intra prediction mode, and
   wherein when the shape of the current block is a square, the intra prediction mode of the current block is determined as one of the non-extended intra prediction mode.

8. A method of encoding a video, the method comprising:
   obtaining a first prediction value for a current sample in a current block based an intra prediction mode of the current block and a first reference sample, the intra prediction mode being representative of a directional intra prediction mode, the first reference sample being located on a forward direction of the directional intra prediction mode from the current sample; and
   generating a final prediction value of the current sample in the current block by modifying the first prediction value based on a second reference sample,
   wherein the intra prediction mode of the current block is determined as one of either conventional intra prediction modes or extended intra prediction modes,
   wherein whether the intra prediction mode of the current block is determined as one of the conventional intra prediction modes or the extended intra prediction modes is determined based on a shape of the current block,
   wherein the second reference sample is located on an opposite direction of the directional intra prediction mode from the current sample,
   wherein the final prediction value is generated based on a weighted sum of the first prediction value and the second reference sample, and
   wherein modifying the first prediction value is performed in response that a size of the current block is greater than a threshold value.

9. A non-transitory computer-readable medium for storing data associated with a video signal, comprising:
   a data stream stored in the non-transitory computer-readable medium, the data stream comprising intra prediction mode information for intra prediction of a current block,
   wherein an intra prediction mode of a current block is determined based on the intra prediction mode information,
   wherein the intra prediction mode of the current block is determined as one of either conventional intra prediction modes or extended intra prediction modes,
   wherein whether the intra prediction mode of the current block is determined as one of the conventional intra prediction modes or the extended intra prediction modes is determined based on a shape of the current block,
   wherein, in response to a case that the intra prediction mode of the current block is a directional intra prediction mode, a first prediction value for a current sample in the current block is obtained based on a first reference sample located on a forward direction of the directional intra prediction mode from the current sample,
   wherein a final prediction value of the current sample in the current block is generated by modifying the first prediction value based on a second reference sample,
   wherein the second reference sample is located on an opposite direction of the directional intra prediction mode from the current sample,
   wherein the final prediction value is generated based on a weighted sum of the first prediction value and the second prediction value, and
   wherein the modification of the first prediction value is performed in response that a size of the current block is greater than a threshold value.

* * * * *